(12) United States Patent
Ferreiro et al.

(10) Patent No.: US 9,346,988 B2
(45) Date of Patent: May 24, 2016

(54) ADHESIVE COMPOSITION AND STRUCTURE COMPRISING AT LEAST ONE LAYER OF THE SAID COMPOSITION

(75) Inventors: Vincent Ferreiro, Saint-Sebastien de Morsent (FR); Thibaut Montanari, Menneval (FR); Fabrice Montezin, Saint Aubin de Scellon (FR)

(73) Assignee: Arkema France, Colombes (FR)

( * ) Notice: Subject to any disclaimer, the term of this patent is extended or adjusted under 35 U.S.C. 154(b) by 1167 days.

(21) Appl. No.: 12/395,808

(22) Filed: Mar. 2, 2009

(65) Prior Publication Data
US 2009/0252979 A1 Oct. 8, 2009

(30) Foreign Application Priority Data
Mar. 3, 2008 (FR) ..................... 08 51379

(51) Int. Cl.
| | |
|---|---|
| *B32B 1/08* | (2006.01) |
| *B32B 1/02* | (2006.01) |
| *B32B 7/12* | (2006.01) |
| *B32B 27/08* | (2006.01) |
| *B32B 27/18* | (2006.01) |
| *B32B 27/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *C09J 177/00* | (2006.01) |
| *C09J 177/02* | (2006.01) |
| *C09J 177/06* | (2006.01) |
| *C08L 77/00* | (2006.01) |
| *C08L 77/02* | (2006.01) |
| *C08L 77/06* | (2006.01) |
| *F16L 11/04* | (2006.01) |
| *B32B 27/28* | (2006.01) |
| *C08L 51/06* | (2006.01) |

(52) U.S. Cl.
CPC ............... *C09J 177/06* (2013.01); *B32B 1/02* (2013.01); *B32B 1/08* (2013.01); *B32B 7/12* (2013.01); *B32B 27/08* (2013.01); *B32B 27/18* (2013.01); *B32B 27/20* (2013.01); *B32B 27/285* (2013.01); *B32B 27/30* (2013.01); *B32B 27/304* (2013.01); *B32B 27/306* (2013.01); *B32B 27/32* (2013.01); *B32B 27/322* (2013.01); *B32B 27/34* (2013.01); *B32B 27/36* (2013.01); *C09J 177/00* (2013.01); *C09J 177/02* (2013.01); *F16L 11/04* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2270/00* (2013.01); *B32B 2307/30* (2013.01); *B32B 2307/412* (2013.01); *B32B 2307/50* (2013.01); *B32B 2307/546* (2013.01); *B32B 2307/714* (2013.01); *B32B 2307/7265* (2013.01); *B32B 2307/734* (2013.01); *B32B 2439/40* (2013.01); *B32B 2597/00* (2013.01); *B32B 2605/00* (2013.01); *C08L 51/06* (2013.01); *C08L 77/00* (2013.01); *C08L 77/02* (2013.01); *C08L 77/06* (2013.01); *C08L 2205/03* (2013.01); *F16L 2011/047* (2013.01); *Y10T 428/31725* (2015.04); *Y10T 428/31728* (2015.04)

(58) Field of Classification Search
None
See application file for complete search history.

(56) References Cited

U.S. PATENT DOCUMENTS

| | | | | |
|---|---|---|---|---|
| 3,819,473 | A * | 6/1974 | Russell et al. | 428/458 |
| 3,833,442 | A * | 9/1974 | Russell et al. | 156/331.8 |
| 4,773,558 | A * | 9/1988 | Taira et al. | 220/270 |
| 5,283,282 | A * | 2/1994 | Hamada et al. | 525/92 B |
| 6,384,115 | B1 * | 5/2002 | Van Gysel et al. | 524/169 |
| 7,122,233 | B2 * | 10/2006 | Montanari et al. | 428/35.7 |
| 2002/0012806 | A1 | 1/2002 | Flepp et al. | |
| 2009/0318630 | A1 * | 12/2009 | Montanari et al. | 525/432 |

FOREIGN PATENT DOCUMENTS

| | | |
|---|---|---|
| EP | 1162061 A1 | 12/2001 |
| WO | WO 2007144531 A2 * | 12/2007 |

* cited by examiner

*Primary Examiner* — Frank D Ducheneaux
(74) *Attorney, Agent, or Firm* — Millen, White, Zelano & Branigan, P.C.

(57) ABSTRACT

The invention relates to an adhesive composition comprising at least one polyamide A, with a mean number of carbon atoms per nitrogen atom (C/N), noted $C_A$, of between 4 and 8.5; at least one polyamide B, with a melting point of greater than or equal to 180° C. and a mean number C/N, noted $C_B$, of between 7 and 10; at least one polyamide C, with a mean number C/N, noted $C_C$, of between 9 and 18; at least 50% by weight of the said composition being formed from one or more polyamides chosen from polyamides A, B and C, the mass-weighted mean of the heats of fusion of these polyamides in the said composition being greater than 25 J/g (DSC), the mean number of C/N of the polyamides A, B and C satisfying the following strict inequality: $C_A < C_B < C_C$, and also to multilayer structures.

16 Claims, No Drawings

ADHESIVE COMPOSITION AND STRUCTURE COMPRISING AT LEAST ONE LAYER OF THE SAID COMPOSITION

The invention relates to an adhesive composition, also known as a binder, and to its use for making structures intended for transferring or storing fluids, such as fuels or biofuels.

The invention relates more particularly to the pipes present in an engine. These pipes may be intended, for example, for transporting fuels, especially from the tank to the engine, for the cooling circuit, for the hydraulic system, or alternatively intended for the air-conditioning circuit or for transporting a mixture of urea and water. These pipes may also form part of underframe applications.

For reasons of safety and environmental protection, especially with the arrival of novel biofuels, motor vehicle constructors impose on the abovementioned pipes particular mechanical characteristics, and also characteristics of very low permeability and of good resistance to the various constituents of fuels, which vary from country to country (hydrocarbons, additives, alcohols such as methanol and ethanol, alcohols possibly being majority components in certain cases), good resistance to engine lubrication oils and to the other chemical products that may be encountered in this environment (battery acid, brake fluids, coolant fluids, and metal salts such as calcium chloride or zinc chloride).

The characteristics of the specifications commonly required by motor vehicle constructors in order for a pipe (or in order for a material for the manufacture of a pipe, for example) to be considered satisfactory are, cumulatively, the following:

- good and long-lasting adhesion between the layers, if the pipe is a multilayer pipe, most particularly after having been exposed to fuel;
- good integrity of the connections (pipes+joints) after circulation of the fuel, i.e. not causing any leaks;
- good size stability of the pipe, when it is used with fuel;
- good resistance to cold shocks (from −30° C. to −40° C. approximately), so that the pipe does not break;
- good heat resistance (approximately 150° C.), so that the pipe does not become deformed;
- good resistance to ageing in a hot oxidative medium (for example: hot air of the engine compartment, from 100 to 150° C. approximately);
- good resistance to fuels and to their degradation products and especially with high peroxide contents;
- very low permeability to fuels, and more particularly good biofuel-barrier properties, for both the polar components (such as ethanol) and the apolar components (hydrocarbons) thereof;
- good flexibility of the pipe to facilitate assembly, especially of the fuel feed pipe;
- good resistance to $ZnCl_2$ (for example in winter, when roads are gritted, the exterior of the pipe being exposed to this environment).

Furthermore, the desired pipes (materials) should avoid the following drawbacks:

- if the pipe is a multilayer pipe, delamination of the layers, especially the inner layers, especially during the insertion of a joint (which may lead to leaks);
- excessive swelling of the pipe after ageing in fuel/diesel systems (including biodiesels or biofuels), which may lead to leaks or problems of positioning under the vehicle.

At the present time, two types of pipe exist, monolayer and multilayer pipes, i.e. pipes constituted of one or more layers of polymer.

Conventionally, the pipes used are manufactured by monoextrusion, if it is a case of a monolayer pipe, or by coextrusion of the various layers, if it is a case of a multilayer pipe, according to the usual techniques for the transformation of thermoplastics.

To ensure good size stability of a multilayer pipe, it is essential to have excellent adhesion between the various layers of polymers forming the pipe. In a very conventional manner, an adhesive layer is placed between two polymer layers which, as a result of their composition, do not or do not sufficiently adhere to each other, to satisfy the specifications mentioned previously.

More generally, the problem to be solved is that of combining high-carbon polyamide materials, i.e. materials in which the mean number of carbon atoms (C) relative to the nitrogen atom (N) is greater than or equal to 9, which are very flexible and very tough materials (in particular with respect to cold shock, to ageing in hot air, and to resistance to zinc chloride), which will generally constitute the outer part of the pipe, combined with barrier materials, i.e. materials that are sparingly permeable to liquids, which will constitute the inner face of the pipe and will occasionally be in direct contact with the liquids, such as petroleum spirit or other fluids mentioned previously.

These barrier materials may be low-carbon polyamides, i.e. polyamides in which the mean number of carbon atoms (C) relative to the nitrogen atom (N) is less than 9, which are preferably semi-crystalline and of high melting point, but also non-polyamide barrier materials such as ethylene-vinyl alcohol copolymer (noted EVOH hereinbelow), or even functionalized fluorinated materials such as functionalized polyvinylidene fluoride (PVDF), functionalized ethylene-tetrafluoroethylene copolymer (ETFE), functionalized ethylene-tetrafluoroethylene-hexafluoropropylene copolymer (EFEP), functionalized polyphenylene sulfide (PPS) or functionalized polybutylene naphthalate.

According to the present patent application, the term "polyamide", also noted PA, is directed towards:
homopolymers,
copolymers or copolyamides, based on different amide units, for instance polyamide 6/12 with amide units derived from lactam-6 and from lactam-12,
polyamide alloys, provided that the polyamide is the major constituent.

There also exists a category of copolyamides in the broad sense, which, although not preferred, falls within the context of the invention. These are copolyamides comprising not only amide units (which will be predominant, hence the fact that they should be considered as copolyamides in the broad sense), but also units of non-amide nature, for example ether units. The best-known examples are the PEBAs or polyether-block-amides and variants thereof copolyamide-ester-ether, copolyamide-ether and copolyamide-ester. Among these, mention will be made of PEBA-12 in which the polyamide units are the same as those of PA12, and PEBA-6.12 in which the polyamides units are the same as those of PA6.12.

The homopolyamides, copolyamides and alloys are also distinguished by their number of carbon atoms per nitrogen atom, given that there are as many nitrogen atoms as there are amide groups (—CO—NH—).

A high-carbon polyamide is a polyamide with a high content of carbon atoms (C) relative to the nitrogen atom (N). These are polyamides with at least about 9 carbon atoms per nitrogen atom, for instance polyamide-9, polyamide-12, polyamide-11, polyamide-110.10 (PA10.10), copolyamides 12/10.T, copolyamide 11/10.T, polyamide-12.T and polyamide-6.12 (PA6.12). T represents terephthalic acid.

The nomenclature used to define polyamides is described in the standard ISO 1874-1:1992 "Plastics—polyamide (PA) materials for moulding and extrusion—Part 1: Designation", especially on page 3 (Tables 1 and 2) and is well known to those skilled in the art.

A low-carbon polyamide is a polyamide with a low content of carbon atoms (C) relative to the nitrogen atom (N). These are polyamides with less than about 9 carbon atoms per nitrogen atom, for instance polyamide-6, polyamide-6.6, polyamide-4.6, copolyamide-6.T/6.6, copolyamide 6.I/6.6, copolyamide 6.T/6.I/6.6 and copolyamide 9.T. I represents the isophthalic diacid.

In the case of a homopolyamide of the type PA-X.Y, with X denoting a unit obtained from a diamine and Y denoting a unit obtained from a diacid, the number of carbon atoms per nitrogen atom is the mean of the number of carbon atoms present in the unit derived from the diamine X and in the unit derived from the diacid Y. Thus, PA6.12 is a PA containing 9 carbon atoms per nitrogen atom, in other words a C9 PA. PA6.13 is C9.5. PA-12.T is C10, the T, i.e. terephthalic acid, being C8.

In the case of copolyamides, the number of carbon atoms per nitrogen atom is calculated according to the same principle. The calculation is performed on a molar pro rata of the various amide units. Thus, coPA-6.T/6.6 60/40 mol % is C6.6: 60%×(6+8)/2+40%×(6+6)/2=6.6. In case of a copolyamide containing units of non-amide type, the calculation is performed solely on the portion of amide units. Thus, for example, PEBA-12, which is a block copolymer of amide units 12 and of ether units, the mean number of carbon atoms per nitrogen atom will be 12, as for PA12; for PEBA-6.12, it will be 9, as for PA6.12.

Thus, high-carbon polyamides such as polyamide PA12 or 11 adhere poorly to an EVOH polymer, to a low-carbon polyamide such as polyamide PA6, or to an alloy of polyamide PA6 and of polyolefin (for instance ORGALLOY®. sold by the company Arkema).

However, it is observed that the pipe structures currently proposed are not satisfactory for a use intended for biofuels, since the specifications demanded by motor vehicle constructors recalled herein-above cannot all simultaneously be met.

Biofuels are not solely derived from petroleum spirit, but comprise a proportion of polar products such as alcohols of plant origin, for instance ethanol or methanol, of at least 3%. This content may rise to 85%, or even 95%.

In addition, the circulation temperature of the fuel is tending to be higher in new engines (which are more confined, running at higher temperature).

Copolyamide-based binders are known. Document EP 1 162 061 (EMS-Chemie AG) describes materials based on one or more copolyamides as adhesive or binder, these copolyamides being constituted of low-carbon units and of high-carbon units. For example, copolyamide 6/12 with relatively similar proportions of units 6 and of units 12 is used to make PA12 adhere to PA6, PA12 to EVOH, PA11 to PA6 or PA 11 to EVOH.

However, it has been observed that such a copolyamide-based adhesive composition will undergo a large drop in adhesion in hot ethanol or on prolonged contact in polar/apolar mixtures such as hot biofuel (ethanol/fuel based on apolar hydrocarbons).

All these binders, which are sparingly crystalline, have the drawback of tending to become dissolved and thus of losing their integrity and their mechanical cohesion in these hot fluids. As a result, adhesion is no longer ensured. The problem is all the more critical the higher the alcohol content of the fuel and the higher the temperature.

Adhesive compositions that are no longer based on sparingly crystalline to non-crystalline copolyamides, but based on mixtures of more crystalline polyamides, by combining using a compatibilizer a high-carbon polyamide such as PA12 with a highly crystalline and/or barrier low-carbon polyamide such as PA6 (for example in EP 1 452 307 and U.S. Pat. No. 6,555,243 from the company EMS-Chemie, and in US 2004/0 058 111 from the company Saint-Gobain) lead to low and insufficient initial levels of adhesion.

Tests were performed using mixtures of crystalline polyamides. Thus, an adhesive composition was prepared comprising 40% PA6, 40% PA12 and 20% compatibilizer of functionalized EPR type (EXXELOR VA1801). This composition is, admittedly, more resistant to the dissolution effect of the hot biofuel, but the adhesion remains at a low or moderate level and insufficient relative to the desired results. The consequences of this poor adhesion are excessive swelling resulting from loss of firmness of the layers, and also permeability to fuels, which becomes very high after immersion or circulation of the fuels in the pipe, leaktightness no longer being maintained between the layers, and possibly leading to leaks at the joint.

Starting from this observation, it therefore becomes necessary to find an adhesive composition that is capable of offering sufficient and long-lasting adhesion and that can afford multilayer pipes which satisfy motor vehicle manufacturers' specifications, in particular during the use of biofuels.

The present invention is thus directed towards overcoming the drawbacks raised above and of proposing an adhesive composition that is efficient in terms of adhesion, to allow its use in multilayer structures of pipes intended for transferring and storing fluids, especially fuels, whether they are conventional fuels or biofuels, this efficiency being maintained even for high fluid circulation temperatures, these circulation temperatures possibly ranging from 40 to 150° C. as a function of the composition of the fuel: between 60 and 90° C. for fuels with a very high alcohol content (for example for "E85", fuel containing 85% ethanol, which is the reference fuel in Brazil and Sweden) and between 120 and 150° C. for fuels with little or no alcohol content (for example lead-free fuel).

In addition, the adhesive composition according to the invention should be able to be used irrespective of the adjacent layers forming the structure of the pipes under consideration, and not solely with adjacent layers based on polyamide or EVOH, as in document US 2004/0 265 527.

The present invention is also directed towards providing multilayer structures using an adhesive composition that overcomes the drawbacks mentioned above.

The Applicant has solved the problem by observing that the combination of, not two, but at least three semicrystalline polyamides, these polyamides being different and immiscible, such that high adhesion power is developed and this power persists even after prolonged contact in cold or hot fluids, these fluids possibly being of polar or apolar and especially mixed nature, such as biofuels.

According to the invention, the adhesive composition comprises:
  at least one polyamide, noted A, with a mean number of carbon atoms per nitrogen atom, noted $C_A$, of between 4 and 8.5 and advantageously between 4 and 7;
  at least one polyamide, noted B, with a melting point of greater than or equal to 180° C. and a mean number of carbon atoms per nitrogen atom, noted $C_B$, of between 7 and 10 and advantageously between 7.5 and 9.5;

at least one polyamide C with a mean number of carbon atoms per nitrogen atom, noted $C_C$, of between 9 and 18 and advantageously between 10 and 18;

at least 50% by weight of the said composition being formed from one or more polyamides chosen from the polyamides A, B and C, the weighted mean per unit mass of the heats of fusion of these polyamides in the said composition being greater than 25 J/g (DSC), the mean number of carbon atoms per nitrogen atom of the polyamides A, B and C also satisfying the following strict inequality: $C_A<C_B<C_C$.

Needless to say, the expression "at least one polyamide A" covers a mixture comprising two or more of the polyamides A as defined above.

It is pointed out that the term "between" used in the preceding paragraphs, and also in the rest of the present description, should be understood as including each of the mentioned limits.

Preferably, when the polyamide(s) A, B and C are copolyamides, then they may be a statistical (or random) or alternating (or regular) copolymer.

This adhesive composition has the advantage of being universal, i.e. of adhering to the polymer layers usually used in the design of the pipes defined above, namely compositions based on high-carbon polyamides, such as PA11 and PA12, on the one hand, and, on the other hand, compositions based on low-carbon polyamides such as PA6, PA6.6, EVOH-based compositions or alloys of low-carbon polyamides and of polyolefins.

Furthermore, it has been found that after contact with alcohol-containing fuels, such as the fuel known as E50 comprising by mass 50% ethanol and 50% supplemented petroleum spirit (the petroleum spirit possibly being, for example, of the type L supplemented with 5% water and 1% methanol, according to the constructor Peugeot's standard SA B31 5220, or being, for example, of the "Fuel C" type, this fuel being a mixture in equal parts of isooctane and toluene), the adhesion remains higher than the recommendations of motor vehicle constructors.

The differences between the mean numbers of carbon atoms per nitrogen atom $(C_B-C_A)$ and $(C_C-C_B)$ may be between 1 and 4 and preferably between 2 and 3.

The adhesive composition may comprise:

from 8% to 33% and preferably 12% to 25% by weight of polyamide A relative to the total weight of the polyamides present in the said composition, from 34% to 84% and preferably 50% to 76% by weight of polyamide B relative to the total weight of the polyamides present in the said composition, from 8% to 33% and preferably 12% to 25% by weight of polyamide C relative to the total weight of the polyamides present in the said composition.

Polyamide A has a ratio between the number of carbon atoms to the number of nitrogen atoms, noted $C_A$, of between 4 and 8.5 (limits inclusive) and preferentially between 4 and 7. As indicated previously, PA6, PA6.6, PA4.6, PA6.T/6.6 and PA6.T/6.I/6.6 are the most typical examples thereof. Preferably, polyamide A is chosen from the polyamides that are the greatest barriers to fuels and biofuels, typically a PA6, a PA4.6 or a PA6.6, but polyamide A may also be a highly crystalline polyamide comprising aromatic units.

Preferably, polyamide A has a heat of fusion of greater than 25 J/g (measured by DSC).

The heats of fusion of the polyamides present in the composition according to the invention are measured in accordance with the standard ISO 11357. Thus, the polyamide is subjected to a first heating at 20° C./minute up to a temperature of 280° C., and then to cooling at 20° C./minute down to a temperature of 20° C., and then to a second heating at 20° C. up to a temperature of 280° C., the heat of fusion being measured during this second heating.

Polyamide A is preferably chosen from homopolyamides. If it is a copolyamide, it should preferably contain little copolymer so as to be sufficiently crystalline, and should have a heat of fusion of greater than 25 J/g (measured by DSC).

Furthermore, the heat of fusion of polyamide A is preferably greater than or equal to 210° C.

Polyamide B has a ratio between the number of carbon atoms to the number of nitrogen atoms, noted $C_B$, of between 7 and 10 (limits inclusive) and preferentially between 7.5 and 9.5.

Preferably, polyamide B has a heat of fusion of greater than 25 J/g (measured by DSC).

PA6.10, PA6.12 and PA-6.14 are the most typical examples thereof. Polyamide B is preferably PA6.10.

When polyamide B is a copolyamide constituted of two different amide units, statistical (or random) and/or alternating (or regular) copolyamides are preferably used in the composition according to the invention.

Polyamide C has a ratio between the number of carbon atoms to the number of nitrogen atoms, noted Cc, which is in the range between 9 and 18 (limits inclusive) and preferentially between 10 and 18.

As mentioned above, PA12, PA11, PA10.10, PA10.12 and PA6.18 are the most typical examples thereof. Mention may also be made of PA12/10T, for example the polyamide having a molar proportion of units 12 identical to that of units 10.T. This type of polyamide is typically referred to as a high-carbon polyamide.

Preferably, polyamide C is chosen from PA12, PA11, PA10.10, PA10.12 and PA6.18.

Preferably, polyamide C has a heat of fusion of greater than 25 J/g (measured by DSC).

Polyamide C is preferably chosen from homopolyamides. If it is a copolyamide, it should preferably contain little copolymer so as to be sufficiently crystalline, and should have a heat of fusion of greater than 25 J/g (measured by DSC).

The melting point of polyamide C is preferably less than 200° C.

Preferably, each of the polyamides A, B and C is highly semicrystalline, i.e. each polyamide A, B or C has a heat of fusion of at least 25 J/g. Thus, when the polyamide A, B or C is a copolyamide, this means that the content of one of the comonomers is sufficiently high, advantageously greater than 80% and preferentially greater than 90%.

The polyamides A, B and C are preferably aliphatic polyamides.

The composition according to the invention preferably has a peel force of greater than 60 N/cm. The adhesion test concerned is performed on a pipe 8 mm in diameter and 1 mm thick. Peeling of one of the layers is performed by subjecting it to traction at an angle of 90° and at a rate of 50 mm/minute.

Thus, advantageously, the adhesive composition according to the invention has an adhesion force of at least 60 N/cm, when it is between a layer of PA12 and a layer of PA6 or of EVOH, and of at least 10 N/cm and preferably at least 20 N/cm after a residence of 72 hours at 80° C. in a mixture of biofuels of the type E50 (corresponding to a mixture comprising by mass 50% ethanol and 50% supplemented petroleum spirit (the petroleum spirit possibly being, for example, of the type L supplemented with 5% water and 1% methanol, according to the constructor Peugeot's standard SA B31 5220, or may be, for example, of the type "Fuel C", the latter being a mixture in equal parts of isooctane and toluene), the adhesion remains higher than the recommendations of motor vehicle constructors.

Thus, this test of adhesion under difficult conditions (immersion in a biofuel for a long time and at high temperature) is one of the effects required for solving the technical problem posed.

Furthermore, in order to ensure good properties (flexibility, burst strength, tear strength, transparency, rheology, capacity for transformation into a pipe or a film, nucleation, crystallization, alloy morphology, compatibilization, homogeneity, consistency, adhesion) and, in particular, good properties of impact strength and of impact strength after ageing (especially high-temperature oxidative ageing), it is possible to add to the adhesive composition an impact-modifying compatibilizer of elastomeric and preferentially polar nature.

Thus, the composition may comprise up to 30% by weight, relative to the total weight of the composition, of an impact modifier constituted by a non-rigid polymer with a modulus of flexure of less than 100 MPa measured according to the standard ISO 178.

This non-rigid polymer is preferably as flexible as possible and has the lowest possible glass transition temperature Tg, i.e. less than 0° C. This impact modifier is, if need be, chemically functionalized so as to be able to react with the polyamides A, B and C and to form an alloy that is compatible therewith.

According to the invention, the impact modifier is preferentially constituted of one or more polyolefins, some or all of them bearing a function chosen from carboxylic acid, carboxylic anhydride and epoxide functions and any other function capable of reacting chemically with the polyamides, typically with its amine chain ends (in the case of carboxylic acid or carboxylic anhydride) or with its acid chain ends (in the case of epoxide, in particular glycidyl methacrylate).

For example, the polyolefin is chosen from:
 a copolymer of ethylene and propylene of elastomeric nature (EPR),
 an ethylene-propylene-diene copolymer of elastomeric nature (EPDM) and
 an ethylene/alkyl (meth)acrylate copolymer.

Among the impact modifiers, mention will be made of anhydride-grafted EPR such as EXXELOR VA1803: A polymer resin that is high flow, amorphous ethylene copolymer functionalized with maleic anhydride by reactive extrusion from Exxon, or the copolymer of polyethylene, ethyl acrylate and maleic anhydride (coPE/EA/MAH), such as LOTADER 4700 from the company Arkema.

The adhesive composition may also comprise up to 50% by weight, relative to the total weight of the composition, of a crystalline polymer having a modulus of flexure, measured according to the standard ISO 178, of greater than 300 MPa and advantageously 800 MPa.

This crystalline polymer is preferably a semicrystalline rigid polyolefin, or a mixture of semicrystalline rigid polyolefins, bearing, totally or partially, a function chosen from carboxylic acid, carboxylic anhydride and epoxide functions.

Preferably, the polyolefin, or the mixture of polyolefins, is chosen from high-density polyethylenes and homopolymeric or sparingly copolymerized polypropylenes.

When it is a polyolefin with a high degree of crystallinity, it may be, for example, a high-density polyethylene, noted hdPE, a functionalized high-density polyethylene, noted hdPEf, with a reactive group that can react with one of the chain ends (or other reactive functions) of the polyamide; typically, this function is an anhydride function, or a high-density polypropylene (PP), typically a linear rigid PP of homopolymeric or very slightly copolymerized type.

The composition may also comprise up to 20% by weight, relative to the total weight of the composition, of a plasticizer.

The composition may also comprise up to 50% by weight, relative to the total weight of the composition, of an additive chosen from antistatic fillers, nucleating agents, lubricants, dyes, pigments, optical brighteners, antioxidants and stabilizers.

The usual stabilizers used with polymers are phenols, phosphites, UV absorbers, stabilizers of the HALS type (Hindered-Amine Light Stabilizer) or metal iodides. Mention may be made of IRGANOX 1010, 245, 1098, IRGAFOS 168, TINUVIN 312 or IODIDE P201 from the company Ciba.

The invention relates to the use of the adhesive composition as defined above for the preparation of structures intended for transferring and storing fluids, in particular a fluid chosen from an oil, a brake fluid, a coolant liquid, a urea solution, a hydrocarbon, a diesel or a fuel, in particular a fuel comprising a high proportion of alcohols such as ethanol.

The invention also relates to multilayer structures.

More particularly, the invention relates to a structure comprising at least two layers, one of the two layers, referred to as the adhesive or binder layer, noted (I), being formed from an adhesive composition as defined above.

According to a first embodiment of the invention, the second layer is a layer referred to as a barrier layer (II).

According to a first advantageous variant of the invention, the barrier layer (II) may be formed by a composition comprising polymers that are barriers to biofuels, preferably chosen from EVOH and polyamide A, and a mixture thereof.

Reference will be made to the description given previously for polyamide A, which is a low-carbon polyamide.

Thus, in a two-layer structure or a multilayer structure, the second layer may comprise a barrier material, which may be chosen from:
 either a composition comprising a copolymer of ethylene and vinyl alcohol (EVOH),
 or low-carbon polyamides, for example amorphous low-carbon polyamides with a high Tg (80-200° C.).

According to a second advantageous variant of the invention, the barrier layer (II) may be formed by a composition comprising a polyamide A, as specified above, and a crystalline polymer with a modulus of flexure, measured according to the standard ISO 178, of greater than 300 MPa and advantageously 800 MPa.

Preferably, the crystalline polymer is a rigid, semicrystalline polyolefin or mixture of polyolefins, with a modulus of flexure, measured according to the standard ISO 178, of greater than 300 MPa, the rigid polyolefin bearing, totally or partially, a function chosen from carboxylic acid, carboxylic anhydride and epoxide functions.

For example, the following composition may be used: an alloy composed of a matrix made of polyamide 6 of Mn (number-average molecular mass) 18000 (for example ULTRAMID B3 from the company BASF) and 30% of hdPE (high-density polyethylene) of density 0.96 and of melt flow index 0.3 (at 190.degree. C. under 2.16 kg), 7% of hdPE functionalized by grafting with 1% of maleic anhydride, of melt flow index 1 (at 190.degree. C. under 2.16 kg), 1.2% of organic stabilizers (constituted of 0.8% phenol LOWINOX 44B25: 4,4'-Butylidenebis(2-t-butyl-5-methylphenol) from the company Great Lakes), 0.2% of phosphite IRGAFOS 168: Tris (2,4-di-tert-butylphenyl)phosphate from the company Ciba, and 0.2% of UV stabilizer TINUVIN 312: Ethanediamide, N-(2-ethoxyphenyl)-N'-(2-ethylphenyl) from the company Ciba, the whole making 100%.

Other compositions may be envisaged for the preparation of the barrier layer (II).

According to a third advantageous variant of the invention, polymer-based compositions may also be envisaged, these polymers preferentially being functionalized with anhydride or with another function that is reacted with the amine or acid chain ends. In a non-limiting manner, mention may be made of fluoro polymers, such as polyvinylidene fluoride (PVDF), ethylene-tetrafluoroethylene copolymer (ETFE), ethylene-tetrafluoroethylene-hexafluoropropylene copolymer (EFEP), or non-fluoro polymers, for instance polyphenylene sulfide (PPS) and polybutylene naphthalate (PBN). These fluoro polymers (PVDF, ETFE and EFEP) and non-fluoro polymers (PPS and PBN) will preferentially be functionalized.

The adhesive layer (I) and barrier layer (II) of the two-layer or multilayer structures that have just been described show excellent adhesion to each other, this adhesion not being deteriorated even after prolonged residence in a fuel comprising alcohols (biofuel).

Given that this barrier layer (II), in its three variants described above, is very sparingly permeable to liquids, especially to fuels, it is generally at the end of the structure, in contact with the liquids or at a level subjacent to a layer in contact with the liquids.

According to this particular embodiment formed by the two-layer structure (I)/(II), the adhesive layer (I) may have toughness properties. It may then constitute the outer or support layer of the two-layer structure (cf. structures 44 and 49 of the table in Appendix 1).

According to a second embodiment of the invention, the structure comprises at least a third layer, known as the tough layer (III), the adhesive layer (I) according to the invention being arranged between the said tough layer (III) and the barrier layer (II) and adhering at their respective contact zone.

Thus, the multilayer structure may be constituted of three layers, in the following successive order (structures 1 to 14 and 29, 30 and 41 to 43 of the table in Appendix 1):
 a tough layer (III) comprising the tough materials as defined below,
 an adhesive layer (I) comprising the adhesive composition according to the invention, and
 a barrier layer (II) comprising the barrier materials as defined above.

The tough layer (III) may be formed from a composition comprising polyamide C, polyamide C being a high-carbon polyamide, as specified above. Specifically, polyamide C offers noteworthy properties, for instance noteworthy longevity, especially noteworthy resistance to ageing and to degradation in corrosive, wet and oxidizing to media, for instance resistance in hot air or in hot chemical products. Polyamide C shows great resistance to stress cracking, to zinc chloride and to chemical products in general. Polyamide C also shows good size stability in media of variable humidity. It is also resistant to impacts.

Preferably, polyamide C is chosen from PA11, PA12, PA10.10, PA10.12 and PA12/10.T, and mixtures thereof.

The tough layer (III) comprising polyamide C defined above may also be chosen to constitute the support or outer layer of the multilayer structure.

On the basis of these three types of layer, tough layer (III), adhesive layer (I) and barrier layer (II), it is possible to produce numerous structures that may comprise up to six layers, using additional barrier, adhesive or tough layers (Structures 26 and 38).

It is possible, according to a third embodiment of the invention, to use two layers of barrier materials, for instance a layer of an ethylene-vinyl alcohol copolymer (EVOH) and a layer of a low-carbon polyamide (polyamide A) combined with a particular polyolefin, the combination of these two barrier layers having synergistic properties (structures 15 to 20 and 28).

According to a fourth embodiment of the invention, the structure comprises, in the following order:
 a third layer, referred to as the tough layer (III),
 the adhesive layer (I) comprising the adhesive composition according to the invention,
 a second layer, known as the barrier layer (II),
 a fourth layer (IV),
the layers adhering to each other via their respective contact zone.

Preferably, the structure may comprise the following successive layers:
 a third tough layer (III) formed from a composition comprising polyamide C,
 the adhesive layer (I) comprising the adhesive composition according to the invention,
 a second barrier layer (II) formed from a composition comprising EVOH, and
 a fourth layer formed from a composition comprising polyamide A.

When the structure comprises a barrier layer (II) and/or the fourth layer (IV) constituted of polyamide A, then this layer comprises at least one semicrystalline rigid polyolefin or mixture of polyolefins, with a modulus of flexure, measured according to the standard ISO 178, of greater than 300 MPa.

Structures of this type have the advantage of having a particularly high barrier effect with respect to biofuel with a low content of ethanol.

It is also possible, according to a fifth embodiment of the invention, to reinforce the outer part of the structure by inserting, between the adhesive layer (I) and the first tough layer (III), a second tough layer as defined above, for example a tough layer of improved impact strength, the said second tough layer adhering to the adjacent layers on their respective contact zone (structure 27).

Moreover, it turns out that the adhesive layer (I) may also have the properties of a barrier material. Consequently, it is possible, according to a sixth embodiment of the invention, to position it at one end of the structure and in contact with the liquids, and to do so
 in a two-layer structure in combination with a tough layer (structure 31),
 in a three-layer structure (structures 46 to 48 and 50), or
 in a four-layer structure (structure 21).

According to a seventh embodiment of the invention, it is also possible to envisage the following structure comprising the following five successive layers:
 tough layer (III),
 adhesive layer (I),
 barrier layer (II),
 adhesive layer (I),
 barrier layer (II),
 the layers adhering to each other via their respective contact zone (structure 40).

According to an eighth embodiment of the invention, the tough layer (III) may also be at each of the ends of the structure. These structures show better resistance to $ZnCl_2$ and to peroxide media (stale fuel or diesel). These structures also have the advantage of having better impact strength performance. For example, this structure may be a three-layer structure (structure 32), thus leading to symmetrical structures.

According to a ninth embodiment of the invention, it is possible to prepare symmetrical structures comprising, for example, the following succession of layers:
- a tough layer (III),
- an adhesive layer (I) according to the invention,
- a barrier layer (II),
- a second-adhesive layer (I),
- a second tough layer (III), the layers adhering to each other via their respective contact zone (structures 22 to 25, 33 to 37 and 39).

Preferably, the structure comprises the following five successive layers:
- a tough layer (III) formed from a composition comprising polyamide C,
- the adhesive layer noted (I),
- a barrier layer (II) formed from a composition comprising EVOH,
- another adhesive layer (1), and
- a tough layer (III) formed from a composition comprising polyamide C, the layers adhering to each other via their respective contact zone.

The thickness of the adhesive layer (I) is advantageously between 25 and 1000 µm and preferably between 25 and 150 µm, when it serves as binder.

The structures described above may be in the form of a pipe, a container, a film or a plate.

When these structures are in the form of a pipe, they may be used for transporting fluids, such as polar and/or apolar liquids, for instance an oil, a brake fluid, a urea solution, a glycol-based coolant liquid, polar or apolar fuels, diesel, biodiesel, i.e. apolar hydrocarbons and esters, in particular fuel, most particularly biofuel, i.e. apolar hydrocarbons and alcohol such as ethanol and methanol.

Such structures are particularly advantageous for transporting fuel, biofuel, biodiesel and coolant liquid, conventionally based on a glycol, and a mixture of urea and water.

The examples that follow serve to illustrate the invention without, however, being limiting in nature.

EXAMPLES

Unless otherwise mentioned, the examples are in the form of pipes with an outside diameter of 8 mm and an inside diameter of 6 mm, i.e. a thickness of 1 mm. These dimensions are characteristic of the dimensions of pipes encountered in the motor vehicle field.

These pipes are manufactured by extrusion or coextrusion according to the standard processes for obtaining pipes.

In the attached appendices, "nc" means not communicated.

1/ Comparative Examples

1.1 Structures of the Counterexamples

The following representative structures of the prior art were prepared and tested:

| 1 | PA11Cu | Binder coPA | PA6Oy |
| 2 | PA11Cu | Binder PPg | PA6Oy |
| 3 | PA11Cu | Binder PA610 + PA6 | PA6Oy |
| 4 | PA11Cu | Binder PA612 + PA6 | PA6Oy |
| 5 | PA11Cu | Binder PA610 + PA12 | PA6Oy |
| 6 | PA11Cu | Binder PA6 + PA12 + imod | PA6Oy |
| 7 | PA11Cu | PA612 | PA6Oy |
| 8 | PA11Cu | PA610 | PA6Oy |
| 9 | PA11Cu | Binder PA610 + PA6 + imod | PA6Oy |
| 10 | PA11Cu | Binder PA610 + PA12 | EVOH | PA6OyE |
| 11 | PA11Cu | PA612 | EVOH | PA6OyE |
| 12 | PA11Cu | PA610 | EVOH | PA6OyE |
| 13 | PA11Cu | Binder coPA | EVOH | PA6OyE |
| 14 | PA11Cu | PA6a | | |
| 15 | PA11Cu | PA610 | | |
| 16 | PA11Cu | | | |
| 17 | PA6a | | | |
| 18 | PPAa | | | |
| 19 | EVOH | | | |
| 20 | PVDFf | | | |
| 21 | PA11Cu | PA6a | | |
| 22 | PA11Cu | EVOH | PA11Cu | |
| 23 | PA12-TL | | | |
| 24 | PA12-TL | PPAa | | |
| 25 | PA12-TL | PPAb | | |

Each line defines a monolayer structure (structures 16 to 19) or multilayer structure, of which the materials in each of these layers are given the columns. For example, the structure defined on line 8 is a three-layer structure successively comprising a stack of a layer of PA11Cu, on a layer of PA610, which is itself in contact with a layer of PA6Oy. The meaning of the materials used to prepare these structures is given below.

1.2 Evaluation and Results of the Structures of the Counterexamples

The results of the structures of the counterexamples are given in the table in Appendix 3.

The meanings of the measurements given in the table are as follows:

Column 1: Measurement of the Adhesion Force Expressed in N/cm.

This is reflected by measuring the peel force, expressed in N/cm, and measured on a pipe 8 mm in diameter that has been conditioned for 15 days at 50% relative humidity at 23° C.

The value given concerns the weakest interface, i.e. the least adherent interface of the multilayer, when there is the greatest risk of delamination. Peeling at the interface is performed by subjecting one of the parts to traction at an angle of 90° and at a speed of 50 mm/minute according to the following process.

A strip of pipe 9 mm wide is taken by cutting. This strip is thus in the form of a tile and still has all the layers of the original pipe. Separation of the two layers of the interface, which it is desired to evaluate, is initiated using a knife. Each of the layers thus separated is placed in the jaws of a tensile testing machine. Peeling is performed by pulling these two layers apart at 180° and at a speed of 50 mm/minute. The strip, and thus the interface, is itself maintained at 90° relative to the direction of traction.

The assessment criteria take this into account and are:
VG=very good, >80
G=good, between 80 and >60
Av.=average (acceptable), between 60 and >30
P=poor, between 30 and 10
VP=very poor, <10.

Column 2: Measurement of the Adhesion Force Expressed in N/cm

This test is the same as for column 1, except that the interior of the tube is filled with a biofuel E50 at 80° C. for 200 hours. The biofuel E50 is a mixture comprising, by mass, 50% ethanol, 44% petroleum spirit L, 5% water and 1% methanol according to the standard B31 5220 of the company Peugeot SA, the "L" petroleum spirit being reference lead-free petroleum spirit of the European standard, referenced under the code E-H-003. These test conditions are much more severe than the preceding ones. The assessment criteria take this into account and are:
VG=very good, >40
G=good, >30 to ≤40
Av.=average (acceptable), >20 to ≤30
P=poor, >10 to ≤20
VP=very poor, ≤10.

Column 3: Qualitative Estimation of the Cold Shock Over the Temperature Range, from the Results of Columns 4, 5 and 6

Scale of qualitative values:
VG=very good
G+=good to very good (G++ between G+ and VG)
G=good
Av.+=average to good
Av.=average (acceptable)
P=poor/insufficient
VP=very poor.

Column 4: Shock Resistance at −30° C.

This is a shock test according to the PSA protocol (company Peugeot SA) according to the standard B21 5540. The pipe is shocked according to this test protocol at −30° C. The percentage of breakage is noted (the lower the better).

Column 5: Shock Resistance at −40° C.

This is a shock test according to the VW protocol (Volkswagen company) according to the standard TL 52435. The tube is shocked according to this test protocol at −40° C. The percentage of breakage is noted.

Column 6: Shock Resistance at −60° C.

This is the same test as previously, but performed at −60° C.

Column 7: Oxidative Ageing

This is the resistance of the multilayer pipe to oxidative ageing in hot air. The pipe is aged in air at 150° C., and is then shocked with a shock according to the standard DIN 73378, this shock being performed at −40° C.: the half-life (in hours) is indicated, which corresponds to the time after which 50% of the tested pipes break. A qualitative comment accompanies this value.

Columns 8 and 9: Efficiency of the Barrier Effect

Column 8 is a qualitative assessment of the barrier effect, this effect being quantified (column 9) via a permeation measurement. The barrier effect is described qualitatively and quantitatively by a permeation measurement. The lower the permeability or permeation, the better the barrier efficiency. This is a measurement of the dynamic permeation (standard PSA B31 5210) in CE10 fuel at 40° C. in g·mm/m²/24 hours. The fuel CE10 comprises 10% ethanol and 90% petroleum spirit of reference "fluid C", which is a mixture in equal amounts of isooctane and toluene. The fuel circulates inside the pipe, and air is to the exterior.

Column 10: Resistance to Zinc Chloride (Inner Face of the Pipe on the Joint Side, where the Pipe is Cut).

Measurement of the resistance to zinc chloride is performed according to the standard SAE J2260. The pipes, bent beforehand with a radius of curvature of 40 mm, are immersed in a 50% $ZnCl_2$ solution. The time after which cracks or the first break appear is noted.

The assessment criteria are as follows:
VG=very good, corresponds to a time ≥1500 hours
G=good, corresponds to a time ≥800 hours
Av.=average, corresponds to a time ≥400 hours
P=poor, corresponds to a time ≤100 hours
VP=very poor, corresponds to a time ≤1 hour.

Column 11: Qualitative and Quantitative Estimation of the Flexibility of the Multilayer Pipe Good flexibility is advantageous for mounting on a vehicle. The term "good flexibility" means a modulus of flexure of less than 1000 MPa, measured according to the standard ISO178.
VG=300-500 MPa
G+=500-700 MPa
G=700-900 MPa
Av.=900-1200 MPa
P=1500-2000 MPa
VP=>2000 MPa The structures of the counterexamples illustrate that either the adhesion is insufficient, or the adhesion after immersion in the biofuel is insufficient, or the ageing, or the shock does not satisfy the desired criteria. For counterexample 23, the adhesion is not measured, since the structure is a monolayer.

2/ Examples of Adhesive Composition According to the Invention

The compositions below according to the invention were prepared. The amounts of products are expressed as weight percentages relative to the total weight of the composition.

| | 1 | 2 | 3 | 4 | 5 | 6 | 7 | 8 | 9 |
|---|---|---|---|---|---|---|---|---|---|
| PA6.10 | 45 | 53 | — | — | 53.3 | — | 64 | 28 | 69 |
| PA6.12 | — | — | 53 | — | — | 53.3 | — | — | — |
| PA6.14 | — | — | — | 53 | — | — | — | — | — |
| PA6 | 18 | 18 | 18 | 18 | 18 | 18 | 18 | 18 | 10 |
| PA12 | 18 | 18 | 18 | 18 | 18 | 18 | 18 | 18 | 10 |
| CoPE/EA/MAH Lotader | 10 | 10 | 10 | 10 | 10 | — | — | — | 10 |
| EPR1 | — | — | — | — | — | 10 | — | — | — |
| hdPEf | — | — | — | — | — | — | — | 10 | — |
| hdPE | — | — | — | — | — | — | — | 25 | — |
| Plasticizer | 8 | — | — | — | — | — | — | — | — |
| Stab1 | 1 | 1 | 1 | 1 | — | — | — | 1 | 1 |
| StabCu | — | — | — | — | 0.7 | 0.7 | — | — | — |
| ΔHf (J/g) | 61 | 61 | 65 | 64 | 61 | 65 | 61 | 62 | 61 |

| | 10 | 11 | 12 | 13 | 14 | 15 | 16 | 17 | 18 |
|---|---|---|---|---|---|---|---|---|---|
| PA6.10 | 12 | 12 | 12 | — | — | — | — | — | — |
| PA6.12 | — | — | — | 12 | 12 | 45 | 12 | 12 | 18 |
| PA6f | — | — | 41 | 41 | 41.3 | — | — | — | — |
| PA6 | 24 | 24 | — | — | — | — | — | — | — |
| PA12 | — | 45 | 24 | 24 | 24 | 18 | 24 | 24 | 24 |
| CoPE/EA/MAH Lotader | 10 | 10 | 10 | 10 | — | — | — | — | — |
| PA11 | 45 | — | — | — | — | — | — | — | — |
| EPR1 | — | — | — | — | 10 | 10 | 10 | 10 | 10 |
| PPA | — | — | — | — | — | 18 | 53 | — | — |
| MXD6 | — | — | — | — | — | — | — | 53 | — |
| amPASA | — | — | — | — | — | — | — | — | 47 |
| Plasticizer | 8 | 8 | 12 | 12 | 12 | 8 | — | — | — |
| Stab1 | 1 | 1 | 1 | 1 | — | 1 | 1 | 1 | 1 |
| StabCu | — | — | — | — | 0.7 | — | — | — | — |
| ΔHf (J/k) | 56 | 57 | 63 | 64 | 64 | 57 | 44 | 52 | 29 |

The heats of fusion ($\Delta$Hf (J/g)) measured and reported in the above tables correspond to the mass-weighted mean of the heats of fusion of the polyamides present in the compositions. They are measured by DSC (Differential Scanning Calorimetry) as defined above.

The adhesive compositions 1 to 18 are prepared according to the method that is common to those skilled in the art, by compounding, i.e. they are mixed together in molten form in an extruder, typically a Werner & Pfleiderer twin-screw extruder.

These adhesive compositions may be intended for making an adhesive layer within multilayer structures, such as those of the examples given in Appendix 1.

There is an alternative to this method. It consists in using the adhesive composition according to the invention as additive in a layer of non-adhesive material. To do this, after having prepared an adhesive composition conventionally by compounding, the said adhesive composition is mixed in the desired amount with a non-adhesive composition, which constitutes one of the non-adhesive layers of the multilayer structure. This mixture prepared in the solid state by combining the two compositions is known as a "dry blend".

This technique allows a non-adhesive layer to be given the desired adhesion. This technique has the advantage of reducing the number of layers necessary for the multilayer structure.

This technique (dry-blend) may lead to an adhesive composition according to the invention, since the characteristics of the composition according to the invention before mixing are concerned after mixing.

The following compositions are obtained from dry-blend mixing and are, after mixing, compositions according to the invention:

Composition 19:
PA12-TL+20% of the adhesive composition 1 (base PA610)
Composition 20:
PA12-TL+20% of the adhesive composition 3 (base PA6)
Composition 21
PA6a+20% of the adhesive composition 1 (base PA610)
Composition 22
PPAa+20% of the adhesive composition 1 (base PA610)
Composition 23
PPAa+20% of the adhesive composition 11 (base PA12)

All these examples of compositions obtained via the dry-blend technique are compositions comprising at least three polyamides $C_A$, $C_B$, $C_C$, which are appropriately different and which satisfy the criteria of the invention.

3/ Evaluation and Results of the Adhesive Compositions 1 to 18 According to the Invention Compositions 1 to 18 defined in the above table were subjected to the shock performance test described above for columns 3 to 6 of Appendix 3 of the tests performed for the structures of the counterexamples.

For some of these compositions, the modulus of flexure and the MFI are measured.

|  | 1 | 2 | 3 | 4 | 5 | 6 | 7 | 8 | 9 |
|---|---|---|---|---|---|---|---|---|---|
| Shock performance | G | VG | VG | VG | VG | VG | Av. | B | nc |
| PSA-30° C. | 0 | 0 | 0 | 0 | 0 | 0 | 10 | 0 | nc |
| VW-40° C. | 76.6 | 43.3 | 60 | 20 | 38 | 10 | 100 | 80 | nc |
| VW-60° C. | 100 | 100 | 100 | 100 | 100 | 100 | 100 | 100 | nc |
| Modulus of flexure | 350 | 810 | 830 | 740 | 815 | 800 | nc | 1100 | 960 |
| MFI 235° C. 5 kg | 2 | 0.7 | 0.8 | 0.7 | 0.6 | 0.7 | nc | 2.8 | 0.4 |

|  | 10 | 11 | 12 | 13 | 14 | 15 | 16 | 17 | 18 |
|---|---|---|---|---|---|---|---|---|---|
| Shock performance | VG | G | G | G | G | Av. | nc | nc | nc |
| PSA-30° C. | 0 | 0 | 0 | 0 | 0 | 0 | nc | nc | nc |
| VW-40° C. | 0 | 33 | 47 | 53 | 40 | 80 | nc | nc | nc |
| VW-60° C. | 30 | 100 | 100 | 100 | 100 | 100 | nc | nc | nc |
| Modulus of flexure | 300 | 350 | 340 | 350 | 335 | 680 | 1500 | 1600 | 1450 |
| MFI 235° C. 5 kg | 8 | 2 | 15 | 14 | 17 | nc | — | — | 2.5 |
| MFI 275° C. 5 kg | — | — | — | — | — | — | — | 5 | — |
| MFI 300° C. 5 kg | — | — | — | — | — | — | 12 | — | — |

For these composition examples 1 to 18, the described properties correspond to the same definitions as for the tables in Appendix 2 and Appendix 3.

5/ Examples of Multilayer Structures

Examples of multilayer structures according to the invention are collated in the table of Appendix 1.

The results for the multilayer structures according to the invention featured in the table of Appendix 1 are given in the table of Appendix 2: the results reported in the columns correspond to the measurements defined above with the additional column 12.

Column 12: Antistatic Character

This column indicates the antistatic character on the inner face of the multilayer pipe. The antistatic character is occasionally required in the specifications for certain countries. This character conventionally corresponds to a superficial resistivity value of less than or equal to $10^6$ ohms. This character may thus be an additional advantage in certain countries.

The components of the structures used in examples have the following meanings:

PA6.10 meaning Polyamide 6.10 of Mn (number-average molecular mass) 30000 and having an excess of amine NH2 chain end relative to the COOH chain end, the concentration of NH2 chain end being 45 μeq/g. Its melting point is 223° C. and its heat of fusion is 61 kJ/kg.

PA6.12 meaning Polyamide 6.12 of Mn (number-average molecular mass) 29000 and having an excess of amine NH2 chain end relative to the COOH chain end, the concentration of NH2 chain end being 47 μeq/g. Its melting point is 218° C. and its heat of fusion is 67 kJ/kg.

PA6.14 meaning Polyamide 6.14 of Mn (number-average molecular mass) 30000 and having an excess of amine NH2 chain end relative to the COOH chain end, the concentration of NH2 chain end being 45 μeq/g. Its melting point is 202° C. and its heat of fusion is 66 kJ/kg.

PA6 meaning Polyamide 6 of Mn (number-average molecular mass) 28000. Its melting point is 220° C. and its heat of fusion is 68 kJ/kg.

PA6f means Polyamide 6 of Mn (number-average molecular mass) 18000. Its melting point is 220° C.

PA12 meaning Polyamide 12 of Mn (number-average molecular mass) 35000. Its melting point is 178° C. and its heat of fusion is 54 kJ/kg.

PA11 meaning Polyamide 11 of Mn (number-average molecular mass) 29000. Its melting point is 190° C. and its heat of fusion is 56 kJ/kg.

PA11Cu denotes a composition based on polyamide 11 of Mn (number-average molecular mass) 29000, containing 5% plasticizer BBSA (benzyl butyl sulfonamide), 6% impact modifier of ethylene/ethyl acrylate/anhydride type in a 68.5/30/1.5 mass ratio (MFI 6 at 190.degree. C. under 2.16 kg) and 0.5% stabilizer based on copper iodide and potassium iodide of POLYADD P201 type (from Ciba). The melting point of this composition is 185° C.

PA1210T-Cu denotes a coPA12/10.T, i.e. a copolyamide 12 with 50 mol % of 10.T, 10.T corresponding to the C10 linear diamine and T to terephthalic acid, this copolymer being of Mn 20000, this copolymer being stabilized with 0.5% stabilizer based on copper iodide and potassium iodide of POLYADD P201 type (from Ciba).

PA1010Cu denotes a composition based on polyamide 10.10 of Mn (number-average molecular mass) 33000, containing 10.5% plasticizer BBSA (benzyl butyl sulfonamide), 12% anhydride-functionalized EPR EXXELOR VA1801 (from Exxon) and 0.5% stabilizer based on copper iodide and potassium iodide of POLYADD P201 type (from Ciba). The melting point of this composition is 196° C.

PA11-TL denotes a composition based on polyamide 11 of Mn (number-average molecular mass) 29000, containing 5% plasticizer BBSA (benzyl butyl sulfonamide), 6% impact modifier of ethylene/ethyl acrylate/anhydride type in a 68.5/30/1.5 mass ratio (MFI 6 at 190.degree. C. under 2.16 kg), and 1.2% organic stabilizers constituted of 0.8% phenol (LOWINOX 44B25: 4,4'-Butylidenebis(2-t-butyl-5-methylphenol) from the company Great Lakes), 0.2% phosphite (IRGAFOS 168: Tris (2,4-di-tert-butylphenyl)phosphate from the company Ciba) and 0.2% UV stabilizer (TINUVIN 312: Ethanediamide, N-(2-ethoxyphenyl)-N'-(2-ethylphenyl) from the company Ciba). The melting point of this composition is 185° C.

PA12-TL denotes a composition based on polyamide 12 of Mn (number-average molecular mass) 35000, containing 6% plasticizer BBSA (benzyl butyl sulfonamide), 6% anhydride-functionalized EPR EXXELOR VA1801 (from Exxon), and 1.2% organic stabilizers constituted of 0.8% phenol (LOWINOX 44B25: 4,4'-Butylidenebis(2-t-butyl-5-methylphenol from the company Great Lakes), 0.2% phosphite (IRGAFOS 168: Tris (2,4-di-tert-butylphenyl)phosphate from the company Ciba and 0.2% UV stabilizer (TINUVIN 312: Ethanediamide, N-(2-ethoxyphenyl)-N'-(2-ethylphenyl from the company Ciba). The melting point of this composition is 175° C.

PA6a denotes a composition based on polyamide 6 of Mn (number-average molecular mass) 28000, containing 10% plasticizer BBSA (benzyl butyl sulfonamide), 12% functionalized EPR EXXELOR VA1801 (from Exxon) and 1.2% organic stabilizers constituted of 0.8% phenol (Lowinox 44B25 from the company Great Lakes), 0.2% phosphite (IRGAFOS 168: Tris (2,4-di-tert-butylphenyl)phosphate from the company Ciba) and 0.2% UV stabilizer (TINUVIN 312: Ethanediamide, N-(2-ethoxyphenyl)-N'-(2-ethylphenyl from the company Ciba). The melting point of this composition is 215° C.

PA6p1 denotes a composition based on polyamide 6 of Mn (number-average molecular mass) 18000, containing 12% plasticizer BBSA and 1.2% organic stabilizers constituted of 0.8% phenol (LOWINOX 44B25: 4,4'-Butylidenebis(2-t-butyl-5-methylphenol from the company Great Lakes), 0.2% phosphite (TINUVIN 312: Ethanediamide, N-(2-ethoxyphenyl)-N'-(2-ethylphenyl from the company of Ciba). The melting point of this composition is 215° C.

PA6Oy denotes an alloy composed of a matrix made of polyamide 6 of Mn 18000 (for example ULTRAMID B3 from the company BASE) and 30% hdPE (high-density polyethylene) of density 0.96 and of melt flow index 0.3 (at 190.degree. C. under 2.16 kg), 7% hdPE functionalized by grafting with 1% maleic anhydride, with a melt flow index of 1 (at 190° C. under 2.16 kg), 1.2% organic stabilizers (constituted of 0.8% phenol (LOWINOX 44B25: 4,4'-Butylidenebis(2-t-butyl-5-methylphenol from the company Great Lakes), 0.2% phosphite (IRGAFOS 168: Tris (2,4-di-tert-butylphenyl)phosphate from the company Ciba, and 0.2% UV stabilizer (TINUVIN 312: Ethanediamide, N-(2-ethoxyphenyl)-N'-(2-ethylphenyl from the company Ciba), the whole making 100%. The melting point of this composition is 220° C.

PA6OyE denotes an alloy composed of a matrix made of polyamide 6 of Mn 18000 (for example ULTRAMID B3 from the company BASF) and 25% hdPE (high-density polyethylene) of density 0.96 and of melt flow index 0.3 (at 190° C. under 2.16 kg), 10% functionalized EPR EXXELOR VA1803 (from Exxon), 8% plasticizer BBSA (benzyl butyl sulfonamide), and 1.2% organic stabilizers constituted of 0.8% phenol (LOWINOX 44B25: 4,4'-Butylidenebis(2-t-butyl-5-methylphenol from the company Great Lakes), 0.2% phosphite (IRGAFOS 168: Tris (2,4-di-tert-butylphenyl)phosphate from the company Ciba) and 0.2% UV stabilizer (TINUVIN 312: Ethanediamide, N-(2-ethoxyphenyl)-N'-(2-ethylphenyl from the company Ciba), the whole making 100%. The melting point of this composition is 220° C.

PA11Impact-TL denotes a composition based on polyamide 11 of Mn (number-average molecular mass) 29000, containing 20% impact modifier of ethylene/ethyl acrylate/anhydride type in a 68.5/30/1.5 mass ratio (MFI 6 at 190° C. under 2.16 kg), and 1.2% organic stabilizers constituted of 0.8% phenol (LOWINOX 44B25: 4,4'-Butylidenebis(2-t-butyl-5-methylphenol from the company Great Lakes), 0.2% phosphite (IRGAFOS 168: Tris (2,4-di-tert-butylphenyl)phosphate from the company Ciba) and 0.2% UV stabilizer (TINUVIN 312: Ethanediamide, N-(2-ethoxyphenyl)-N'-(2-ethylphenyl from the company Ciba). The melting point of this composition is 190° C.

PA11-C denotes a composition based on polyamide 11 of Mn (number-average molecular mass) 29000, containing 10% plasticizer BBSA (benzyl butyl sulfonamide), 22% carbon black Ensaco 200 and 1.2% organic stabilizers (constituted of 0.8% phenol (LOWINOX 44B25: 4,4'-Butylidenebis (2-t-butyl-5-methylphenol from the company Great Lakes, 0.2% phosphite (IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl) from the company Ciba). The melting point of this composition is 185° C.

PA1210T-TL denotes a coPA12/10.T, i.e. a copolyamide 12 with 50 mol % of 10.T, 10.T corresponding to the linear $C_{10}$ diamine and T to terephthalic acid, this copolymer being of Mn 20000, this copolymer being stabilized with 1.2% organic stabilizers constituted of 0.8% phenol (LOWINOX 44B25: 4,4'-Butylidenebis(2-t-butyl-5-methylphenol from the company Great Lakes), 0.2% phosphite (IRGAFOS 168: Tris (2,4-di-tert-butylphenyl)phosphate from the company Ciba) and 0.2% UV stabilizer (TINUVIN 312: Ethanediamide, N-(2-ethoxyphenyl)-N'-(2-ethylphenyl) from the company Ciba).

PA11Impact denotes a composition based on polyamide 11 of Mn (number-average molecular mass) 29000, containing 20% impact modifier of the ethylene/ethyl acrylate/anhydride type in a 68.5/30/1.5 mass ratio (MFI 6 at 190° C. under 2.16 kg), and 0.5% stabilizer based on copper iodide and potassium iodide of POLYADD P201 type (from Ciba). The melting point of this composition is 190° C.

PA11p1 denotes a composition based on polyamide 11 of Mn (number-average molecular mass) 35000, containing 12% plasticizer BBSA (benzyl butyl sulfonamide) and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl) from the company Ciba). The melting point of this composition is 185° C.

PA12-Cu denotes a composition based on polyamide 12 of Mn (number-average molecular mass) 35000, containing 6% plasticizer BBSA (benzyl butyl sulfonamide), 6% anhydride-functionalized EPR EXXELOR VA1801 (from Exxon) and 0.5% stabilizer based on copper iodide and potassium iodide of POLYADD P201 type (from Ciba). The melting point of this composition is 175° C.

MXD.6 means Polyamide of MXD.6 type, MXD denoting m-xylylenediamine, of Mn 25000, with a melting point of 237° C. and a heat of fusion of 46 kJ/kg. This type of polyamide is sold, for example, by the company Mitsubishi under the name MX Nylon.

MXD6hi denotes a composition based on copolyamide of MXD.6 type and impact modifier, sold under the name IXEF BXT 2000 by the company Solvay. Its melting point is 237° C.

PPA means polyphthalamide of copolyamide 6T/6 type of 71%/29% mass proportion, of Mn 13500, also sold under the name ULTRAMID TKR4351 by the company BASF. Its melting point is 295° C. and its heat of fusion is 34 kJ/kg.

PPAa denotes a composition based on polyphthalamide of coPA6.T/6.I/6.6, AMODEL EXT1800 from the company Solvay. The melting point of this composition is 310° C.

PPAb denotes a composition based on polyphthalamide of copolyamide 6.T/6 type, ULTRAMID TKR4351 from the company BASF, and 25% functionalized EPR EXXELOR VA1801 (from Exxon), and 0.5% stabilizer based on copper iodide and potassium iodide of POLYADD P201 type (from Ciba). The glass transition temperature of this amorphous composition is 295° C.

amPASA means polyphthalamide of coPA6.I/6.T copolyamide type, containing 70% by mass of unit 6.1, and of Mn 14000. This product is amorphous, and its glass transition temperature Tg is 125° C.

amPASAa denotes a polyphthalamide-based composition of the copolyamide coPA6.I/6.T type, containing 70% by mass of unit 6.1, and 25% functionalized EPR EXXELOR VA1801 (from Exxon) and 0.5% stabilizer based on copper iodide and potassium iodide of POLYADD P201 type (from Ciba). The glass transition temperature of this amorphous composition is 115° C.

coPE/EA/MAH meaning Ethylene-ethyl acrylate-maleic anhydride copolymer in a 68.5/30/1.5 mass ratio (MFI 6 at 190° C. under 2.16 kg) used as impact modifier. Its modulus of flexure is 30 MPa approximately, according to the standard ISO 178.

EPR1 denoting a copolymer of ethylene and propylene of elastomeric nature functionalized with a group that is reacted with an anhydride function (at 0.5-1% by mass), of MFI 9 (at 230° C., under 10 kg), of the type EXXELOR VA1801 from the company Exxon, used as impact modifier. Its modulus of flexure is 10 MPa approximately, according to the standard ISO 178.

hdPE denotes a high-density polyethylene, of density 0.962, with a melting point of 136° C., of MFI at 190° C. under 2.16 kg of 0.6.

hdPEf denoting a high-density polyethylene functionalized with a reactive group that can react with one of the chain ends (or other reactive functions) of the polyamide, of density 0.960, of melting point 134° C. and of MFI, at 190° C. under 2.16 kg, of 2.

Stab1 denoting a mixture of organic stabilizers constituted of 0.8% phenol LOWINOX 44B25: 4,4'-Butylidenebis(2-t-butyl-5-methylphenol from the company Great Lakes and 0.2% phosphite IRGAFOS 168: Tris (2,4-di-tert-butylphenyl)phosphate from the company Ciba.

StabCu denoting a mixture of mineral stabilizers based on copper iodide and potassium iodide of POLYADD P201 type (from Ciba).

Plasticizer denoting benzyl butyl sulfonamide (BBSA).

EVOH denotes an ethylene-vinyl alcohol copolymer, for example SOARNOL DC3203RB from the company Nippon Gosei. The melting point of this composition is 183° C.

EVOHim denotes a composition based on EVOH and functionalized EPR impact modifier EXXELOR VA1803 (from Exxon). The melting point of this composition is 183° C.

EVOH100 denotes an ethylene-vinyl alcohol copolymer containing 24% ethylene comonomer, manufactured by the company Eval under the name Eval M100B. The melting point of this composition is 194° C.

PVDFf denotes a composition based on PVDF functionalized with maleic anhydride. The melting point of this composition is 170° C.

ETFE denotes a composition based on ETFE (ethylene-tetrafluoroethylene copolymer) known under the name EP7000, from the company Daikin. The melting point of this composition is 255° C.

EFEP-C denotes an antistatic composition based on EFEP (ethylene-tetrafluoroethylene-hexafluoropropylene copolymer) known under the name RP5000AS, from the company Daikin. The melting point of this composition is 195° C.

Binder coPA denotes a composition based on 40% copolyamide 6/12 (of ratio 70/30 by mass) of Mn 16000, and 40% copolyamide 6/12 (of ratio 70/30 by mass) of Mn 16000.

Binder PPg denotes a composition based on PP (polypropylene) grafted with maleic anhydride, known under the name Admer QF551A from the company Mitsui.

Binder PA610+PA6 denotes a composition based on PA610 (of Mn 30000, and as defined elsewhere) and 36% PA6 (of Mn 28000, and as defined elsewhere) and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl from the company Ciba).

Binder PA612+PA6 denotes a composition based on PA612 (of Mn 29000, and as defined elsewhere) and 36% PA6 (of Mn 28000, and as defined elsewhere) and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl from the company Ciba).

Binder PA610+PA12 denotes a composition based on PA610 (of Mn 30000, and as defined elsewhere) and 36% PA12 (of Mn 35000, and as defined elsewhere) and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate the company Ciba, and 0.2% UV stabilizer TINUVIN 312: Ethanediamide, N-(2-ethoxyphenyl)-N'-(2-ethylphenyl from the company Ciba).

Binder PA6+PA12+imod denotes a composition based on 40% PA6 (of Mn 28000, and as defined elsewhere), 40% PA12 (of Mn 35000, and as defined elsewhere) and 20% functionalized EPR EXXELOR VA1801 (from Exxon) and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl from the company Ciba).

Binder PA610+PA6+imod denotes a composition based on 40% PA6.10 (of Mn 30000, and as defined elsewhere), 40% PA6 (of Mn 28000, and as defined elsewhere) and 20% impact modifier of ethylene/ethyl acrylate/anhydride type in a 68.5/30/1.5 mass ratio (MFI 6 at 190.degree. C. under 2.16 kg), and 1.2% organic stabilizers (constituted of 0.8% phenol LOWINOX 44B25: 4,4'-Butylidenebis(2-t-butyl-5-methylphenol from the company Great Lakes, 0.2% phosphite IRGAFOS 168: Tris (2,4-di-tert-butylphenyl)phosphate from the company Ciba, and 0.2% UV stabilizer TINUVIN 312: Ethanediamide, N-(2-ethoxyphenyl)-N'-(2-ethylphenyl from the company Ciba).

Example of Manufacture of Multilayer Structures: in the Case of Pipes

The multilayer pipes are prepared by coextrusion. A McNeill industrial multilayer extrusion line, equipped with five extruders, connected to a spiral-mandrel multilayer extrusion head, is used.

The screws used are single extrusion screws having pitch profiles adapted to polyamides. In addition to the five extruders and the multilayer extrusion head, the extrusion line comprises:

- a die-punch assembly, located at the end of the coextrusion head; the inside diameter of the die and the outside diameter of the punch are chosen as a function of the structure to be produced and of the materials of which it is composed, and also of the dimensions of the pipe and the line speed;
- a vacuum box with an adjustable pressure-reduction level. In this box circulates water generally maintained at 20° C., in which is immersed a gauge for conforming the pipe in its final dimensions. The diameter of the gauge is adapted to the dimensions of the pipe to be made, typically from 8.5 to 10 mm for a pipe with an outside diameter of 8 mm and a thickness of 1 mm;
- a succession of cooling tanks in which water is maintained at about 20° C., for cooling the pipe along the path from the head to the drawing bench;
- a diameter measurer;
- a drawing bench.

The 5-extruder configuration is used to produce pipes having from two layers to five layers. In the case of structures with less than five layers, several extruders are then fed with the same material.

In the case of the structures comprising six layers, an additional extruder is connected and a spiral mandrel is added to the existing head, in order to produce the inner layer, in contact with the fluid.

Before the tests, in order to ensure that the pipe has the best properties and good extrusion quality, it is checked that the extruded materials have a residual moisture content before extrusion of less than 0.08%. If this is not the case, an additional step of drying the material is performed before the tests, generally in a vacuum dryer, overnight at 80° C.

Reference will be made to Appendix 4, which presents in detail the extrusion parameters used for Examples 33 (5 layers), 18 (4 layers) and 2 (3 layers) of Appendix 1, for the manufacture of pipes with an outside diameter of 8 mm and an inside diameter of 6 mm, i.e. a thickness of 1 mm.

For these three particular examples, as for all the others, the pipes, which satisfy the characteristics described in the present patent application, were taken, after stabilization of the extrusion parameters, the nominal dimensions of the pipes no longer changing over time. The diameter is checked by a laser diameter measurer installed at the end of the line.

Generally, the line speed is typically 20 m/minute. It generally ranges between 5 and 100 m/minute.

The speed of the extruder screws depends on the thickness of the layer and on the diameter of the screw, as is known to those skilled in the art.

In general, the temperature of the extruders and tools (head and joint) should be set so as to be sufficiently higher than the melting point of the compositions under consideration, such that they remain in molten form, thus preventing them from solidifying and blocking the machine.

For the compositions PA11, PA12, PA6, PA610, PA612, PA614, MDX6, EVOH, PVDF and amPASA, a temperature of about 240° C., or even up to 260° C. if the product is particularly viscous, should be ensured. To do this, at least part of the heating zones of the machine, in particular the part downstream of the screw and the downstream tools (extrusion head and joint) is set at about 240° C., so as to obtain the nominal mix temperature.

For the compositions based on PA1210T or on ETFE, the process should be performed at about 270° C. For the compositions based on PPA or PPAa, the process should be performed at about 310° C. For the compositions based on PPAb, the process should be performed at about 320° C.

Examples of multilayer structures prepared using the "dry-blend" method are given in Appendix 1. It may be illustrated by Example 83, which may be compared with Example 53. Instead of adding the adhesive composition 13 in the form of a layer of binder to make the "PA12-TL" layer adhere to the "PPAb" layer, this adhesive composition 13 is added into the "PA12-TL" layer, which gives the latter the capacity of adhering to the "PPAb" layer. To do this, just before manufacturing the multilayer pipe, the granules of the composition "PA12-TL" are mixed with 20% of granules of the adhesive composition 13. This mixture is then introduced into the multilayer extruder. This mixing then combines the roles of tough outer layer (III) and adhesive layer (I).

Comments concerning the properties of certain structures

The adhesive compositions in which the predominant polyamide is a polyamide of the type $C_A$ offer certain advantages. Thus, in Examples 56 and 69, the intermediate binder layer also acts as barrier or semi-barrier layer (layer of type II or IV). Thus, by comparison of structures 52 and 57, the layer of "PA6a" may be replaced with a layer of binder, of equivalent thickness. Thus, an adhesive composition (binder), in which the predominant polyamide is a polyamide of the type $C_A$ (composition 12 to 14, 16 to 18) combines both the character of binder and of barrier layer (the barrier layers of the type "PA6a", "PA60yE" and "PPAa" not adhering to the "tough" layers based on polyamide $C_C$ such as "PA12-TL"). It is thus advantageous to use adhesive compositions in which the predominant polyamide is a polyamide of the type $C_A$, and in thicknesses that are large enough to be able to benefit from the barrier effect or from a surplus of this effect.

The structures of Examples 64 and 65 illustrate the surplus efficiency in terms of permeability (increased barrier effect) by using this type of adhesive composition, in which the predominant polyamide is a polyamide of the type $C_A$ and in particular of highly barrier type such as a "PPA" or an "MAXD.6".

Noteworthy synergism may also be observed. For example, the multilayer pipe 69 has, relative to its controls, on the one hand, the mono-material pipe "PA12-TL": counterexample 23, and, on the other hand, the mono-material pipe of adhesive composition 13, impact and barrier advantages, without, however, presenting any disadvantages in terms of flexibility or resistance to ageing, at the risk of loss of adhesion between the layers. The multilayer pipes 70 and 71 are also very advantageous, when compared with the monolayer pipes: counterexample 23 and adhesive compositions 13 and 14, not only in terms of impact and barrier, but also in terms of ageing. The pipe of examples 60 also shows an advantageous profile of properties.

Multilayer structures in which the binder comprises as predominant polyamide a polyamide of the type $C_C$ are also featured among the examples. The advantage then becomes that of combining the functions of binder layer (layer of type I) and of tough layer (layer of type III). Specifically, a good proportion of the flexibility, impact, zinc chloride resistance and ageing resistance qualities of a tough layer of the type III are conserved. It is thus possible for such a binder to act as the outer layer.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosures of all applications, patents and publications, cited herein and of corresponding FR application No. 0851379 filed Mar. 3, 2008 are incorporated by reference herein.

The following examples can be repeated with similar success by substituting the generically or specifically described reactants and/or operating conditions of this invention for those used in the following examples.

From the foregoing description, one skilled in the art can easily ascertain the essential characteristics of this invention and, without departing from the spirit and scope thereof, can make various changes and modifications of the invention to adapt it to various usages and conditions.

APPENDIX 1

|    | III       | I                    | II     |                 |
|----|-----------|----------------------|--------|-----------------|
| 1  | PA11Cu    | Adhesive composition 2 | PA6a   | thicknesses 475/50/475 μm |
| 2  | PA11Cu    | Adhesive composition 2 | PA6Oy  |                 |
| 3  | PA1210T-Cu | Adhesive composition 2 | PA6Oy  |                 |
| 4  | PA1010Cu  | Adhesive composition 3 | PA6Oy  |                 |
| 5  | PA11Cu    | Adhesive composition 2 | PA6OyE |                 |
| 6  | PA11-TL   | Adhesive composition 2 | PA6OyE |                 |
| 7  | PA12-TL   | Adhesive composition 2 | PA6OyE |                 |
| 8  | PA11Cu    | Adhesive composition 3 | PA6OyE |                 |
| 9  | PA11Cu    | Adhesive composition 1 | PA6OyE |                 |
| 10 | PA11Cu    | Adhesive composition 8 | PA6OyE |                 |
| 11 | PA11Cu    | Adhesive composition 7 | PA6OyE |                 |
| 12 | PA11Cu    | Adhesive composition 2 | PPAa   |                 |
| 13 | PA11Cu    | Adhesive composition 2 | PPAb   |                 |
| 14 | PA1210T-Cu | Adhesive composition 2 | PPAb   |                 |

APPENDIX 1-continued

| | III | I | II | II | | |
|---|---|---|---|---|---|---|
| 15 | PA11Cu | Adhesive composition 2 | PPAa | PA6OYE | thicknesses 425/50/100/425 μm | |
| 16 | PA11Cu | Adhesive composition 2 | PPAb | PA6OyE | | |
| 17 | PA11Cu | Adhesive composition 2 | amPASAa | PA6OyE | | |
| 18 | PA11Cu | Adhesive composition 2 | EVOH | PA6OyE | | |
| 19 | PA11Cu | Adhesive composition 9 | EVOH | PA6OyE | | |
| 20 | PA11Cu | Adhesive composition 2 | EVOHim | PA6OyE | | |

| | III | I | II | I | | |
|---|---|---|---|---|---|---|
| 21 | PA11Cu | Adhesive composition 2 | PA6Oy | Adhesive composition 2 | thicknesses 475/50/325/150 μm | |

| | III | I | II | I | III | |
|---|---|---|---|---|---|---|
| 22 | PA11Cu | Adhesive composition 2 | PA6Oy | Adhesive composition 2 | PA11-TL | thicknesses 225/50/450/50/225 μm |
| 23 | PA11Cu | Adhesive composition 2 | PPAb | Adhesive composition 2 | PA11-TL | thicknesses 390/50/120/50/390 μm |
| 24 | PA11Cu | Adhesive composition 2 | amPASAa | Adhesive composition 2 | PA11-TL | |
| 25 | PA11Cu | Adhesive composition 2 | PA6Oy | Adhesive composition 2 | PA1210T-TL | |

| | III | I | II | II | I | III | |
|---|---|---|---|---|---|---|---|
| 26 | PA11Cu | Adhesive composition 2 | EVOH | PA6OyE | Adhesive composition 2 | PA11-TL | thicknesses 225/50/100/350/50/225 μm |

| | III | III | I | II | | |
|---|---|---|---|---|---|---|
| 27 | PA11Cu | PA11Impact | Adhesive composition 2 | PA6Oy | thicknesses 375/50/50/425 μm | |

| | III | I | II | II | | |
|---|---|---|---|---|---|---|
| 28 | PA11Cu | Adhesive composition 2 | PA6Oy | PA6a | thicknesses 425/50/375/50 μm | |

| | III | I | II | | |
|---|---|---|---|---|---|
| 29 | PA11Impact | Adhesive composition 2 | PA6Oy | thicknesses 425/50/425 μm | |
| 30 | PA11Impact | Adhesive composition 2 | PA6OyE | | |

| | III | I | | |
|---|---|---|---|---|
| 31 | PA11Cu | Adhesive composition 8 | thickness 500/500 μm | |

| | III | I | III | |
|---|---|---|---|---|
| 32 | PA11Cu | Adhesive composition 8 | PA11-TL | thickn. 250/500/250 μm |

| | III | I | II | I | III | |
|---|---|---|---|---|---|---|
| 33 | PA11Cu | Adhesive composition 2 | EVOH | Adhesive composition 2 | PA11-TL | thickn. 400/50/100/50/400 |
| 34 | PA12-Cu | Adhesive composition 2 | EVOH | Adhesive composition 2 | PA11-TL | |
| 35 | PA11Impact | Adhesive composition 2 | EVOH | Adhesive composition 2 | PA11Impact-TL | |
| 36 | PA11Cu | Adhesive composition 2 | EVOHim | Adhesive composition 2 | PA11-TL | |
| 37 | PA11Cu | Adhesive composition 2 | EVOHim | Adhesive composition 2 | PA11-CondTL | |

APPENDIX 1-continued

| | III | I | II | I | III | III | |
|---|---|---|---|---|---|---|---|
| 38 | PA11Cu | Adhesive composition 2 | EVOH | Adhesive composition 2 | PA11Impact | PA11-CondTL | thickn. 400/50/100/50/325/75 |

| | III | I | II | I | III | |
|---|---|---|---|---|---|---|
| 39 | PA11Cu | Adhesive composition 2 | PVDFf | Adhesive composition 2 | PA11-TL | thickn. 400/50/100/50/400 |

| | III | I | II | I | II | |
|---|---|---|---|---|---|---|
| 40 | PA11Cu | Adhesive composition 2 | PVDFf | Adhesive composition 2 | PA6OyE | thickn. 400/50/100/50/400 |

| | III | I | II | |
|---|---|---|---|---|
| 41 | PA11Cu | Adhesive composition 2 | PVDFf | thickn. 750/50/200 |
| 42 | PA11Cu | Adhesive composition 2 | ETFE | |
| 43 | PA11Cu | Adhesive composition 2 | EFEP-C | thickn. 750/50/50/100 pb 4 layers |

| | I | II | |
|---|---|---|---|
| 44 | Adhesive composition 8 | PA6Oy | thicknesses 500/500 µm |
| 45 | Adhesive composition 5 | PPAa | thicknesses 500/500 µm |

| | I | II | I | |
|---|---|---|---|---|
| 46 | Adhesive composition 2 | PA6Oy | Adhesive composition 2 | thicknesses 250/500/250 µm |
| 47 | Adhesive composition 4 | PA6Oy | Adhesive composition 4 | |
| 48 | Adhesive composition 2 | EVOH | Adhesive composition 2 | |

| | I | II | |
|---|---|---|---|
| 49 | Adhesive composition 2 | PVDFf | thicknesses 900/100 µm |

| | I | II | I | |
|---|---|---|---|---|
| 50 | Adhesive composition 2 | PPAa | Adhesive composition 2 | thicknesses 250/500/250 µm |

| | III | I | II | IV | |
|---|---|---|---|---|---|
| 51 | PA12-TL | Adhesive composition 13 | | | thicknesses 500/500 µm |
| 52 | PA12-TL | Adhesive composition 13 | PA6a | | thicknesses 500/100/400 µm |
| 53 | PA12-TL | Adhesive composition 13 | PPAb | | thicknesses 650/100/250 µm |
| 54 | PA12-TL | Adhesive composition 13 | MXD6hi | | Idem |
| 55 | PA12-TL | Adhesive composition 13 | EVOH | PA6OyE | thicknesses 350/100/100/450 µm |
| 56 | PA12-TL | Adhesive composition 13 | EVOH | Adh. Comp. 13 | thicknesses 350/100/100/450 µm |
| 57 | PA12-TL | Adhesive composition 13 | EVOH | PA6a | thicknesses 350/100/100/450 µm |

| | III | I | II | I | III | |
|---|---|---|---|---|---|---|
| 58 | PA12-TL | Adhesive composition 13 | EVOH | Adh. Comp. 13 | PA12-TL | thicknesses 250/200/100/200/250 µm |
| 59 | PA12-TL | Adhesive composition 12 | EVOH | Adh. Comp. 12 | PA12-TL | thicknesses 250/200/100/200/250 µm |
| 60 | PA11Cu | Adhesive composition 12 | EVOH | Adh. Comp. 12 | PA11-TL | thicknesses 250/200/100/200/250 µm |

APPENDIX 1-continued

| | | | | | |
|---|---|---|---|---|---|
| 61 PA11-TL | Adhesive composition 12 | EVOH100 | Adh. Comp. 12 | PA11-TL | thicknesses 150/300/100/300/150 μm |
| 62 PA12-TL | Adhesive composition 13 | PPA | Adh. Comp. 13 | PA12-TL | thicknesses 250/150/200/150/250 μm |
| III | I | II | I | II/IV | |
| 63 PA12-TL | Adhesive composition 13 | EVOH | Adhesive composition 13 | PPAb | thicknesses 250/200/100/300/150 μm |
| III | I/II | II | I/II | III | |
| 64 PA12-TL | Adhesive composition 17 | EVOH | Adhesive composition 17 | PA12-TL | thicknesses 350/100/100/100/350 μm |
| 65 PA12-TL | Adhesive composition 18 | EVOH | Adhesive composition 18 | PA12-TL | thicknesses 350/100/100/100/350 μm |
| III | I/II | | | | |
| 66 PA12-TL | Adhesive composition 16 | | | | thicknesses 650/350 μm |
| III | I | IV | III | | |
| 67 PA12-TL | Adhesive composition 13 | PA6a | PPAb | | thicknesses 250/100/400/250 μm |
| III | I | III | IV | | |
| 68 PA12-TL | Adhesive composition 13 | PPAb | PA6a | | thicknesses 250/100/250/400 μm |
| III | I/II | III | | | |
| 69 PA12-TL | Adhesive composition 13 | PA12-TL | | | thicknesses 250/500/250 μm |
| 70 PA11Impact-TL | Adhesive composition 13 | PA11Impact-TL | | | thicknesses 250/500/250 μm |
| 71 PA11Impact-TL | Adhesive composition 14 | PA11Impact-TL | | | thicknesses 250/500/250 μm |
| III | I | II | I | III | |
| 72 PA11pl | Adhesive composition 13 | EVOH | Adhesive composition 13 | PA11-C | thicknesses 250/200/100/200/250 μm |
| III/I | II | IV | | | |
| 73 Adhesive composition 11 | PA6a | | | | thicknesses 500/500 μm |
| 74 Adhesive composition 11 | PPAb | | | | thicknesses 750/250 μm |
| 75 Adhesive composition 11 | EVOH | PA6OyE | | | thicknesses 450/100/450 μm |
| III/I | II | III/I | | | |
| 76 Adhesive composition 11 | EVOH | Adhesive composition 11 | | | Idem |
| III/I | II | IV/I | | | |
| 77 Adhesive composition 11 | EVOH | Adhesive composition 13 | | | Idem |
| 78 Adhesive composition 11 | PPA | Adhesive composition 13 | | | thicknesses 400/200/400 μm |
| III/I | II | II/IV | III | | |
| 79 Adhesive composition 11 | EVOH | MXD6hi | Adhesive composition 11 | | thicknesses 400/100/100/400 μm |
| III/I | II | III/I | | | |
| 80 Adhesive composition 11 | PA6pl | Adhesive composition 11 | | | thicknesses 250/500/250 μm |

APPENDIX 1-continued

| | III/I | IV | II | IV | III/I | |
|---|---|---|---|---|---|---|
| 81 | Adhesive composition 11 | PA6pl "dry-blend" | EVOH | PA6pl | Adhesive composition 11 | thicknesses 250/200/100/200/250 μm |

| | III + I | II | |
|---|---|---|---|
| 82 | Composition 19 = PA12-TL + 20% Adh. comp. 1 | PPAb | thicknesses 750/250 μm |
| 83 | Composition 20 = PA12-TL + 20% Adh. comp. 13 | PPAb | Idem |

| | III | I | II | I | III | |
|---|---|---|---|---|---|---|
| 84 | PA12-TL | Composition 21 = PA6a + 20% Adh. comp. 1 | EVOH | Composition 21 | PA12-TL | thicknesses 250/200/100/200/250 μm |

| | III | I + II | |
|---|---|---|---|
| 85 | PA12-TL | Composition 22 = PPAa + 20% Adh. comp. 1 | |
| 86 | PA12-TL | Composition 23 = PPAa + 20% Adh. comp. 11 | |

APPENDIX 2

Evaluation of the structures according to the invention:

| | 1 | 2 | 3 | 4 | 5 | 6 | 7 | 8 | 9 | 10 | 11 | 12 |
|---|---|---|---|---|---|---|---|---|---|---|---|---|
| 1 | VG, >80 | G, >30 | G+ | 0 | 0 | 38 | Av. > 250 | Av. | 190 | VP | G+ | nc |
| 2 | VG, >80 | G, >30 | G | 0 | 37 | 73 | VG > 1000 | G+ | 35 | P | G | nc |
| 3 | VG, >80 | G, >30 | G | 0 | nc | nc | G > 500 | G++ | <30 | P | G | nc |
| 4 | nc | nc | G | 0 | nc | nc | G > 500 | nc | nc | P | G | nc |
| 5 | VG, >80 | G, >30 | G+ | 0 | 0 | 27 | G > 1000 | G | 55 | P | G+ | nc |
| 6 | VG, >80 | G, >30 | G+ | 0 | 0 | 30 | Av. > 250 | G | 55 | P | G+ | nc |
| 7 | VG, >80 | G, >30 | G | 0 | 33 | 60 | Av. > 250 | G | 60 | P | G+ | nc |
| 8 | G, >60 | Av., >25 | G | 0 | 0 | 60 | VG > 1000 | G | 57 | P | G+ | nc |
| 9 | VG, >80 | G, >30 | G+ | 0 | 0 | 33 | VG > 1000 | G | 57 | P | G+ | nc |
| 10 | G, >60 | G, >30 | G | 0 | 0 | 60 | VG > 1000 | G | 52 | P | G+ | nc |
| 11 | G, >60 | G, >30 | G | 0 | 0 | 50 | VG > 1000 | G | 54 | P | G+ | nc |
| 12 | G, >60 | G, >30 | G | 0 | nc | nc | Av. > 250 | G++ | <30 | Av. | Av. | nc |
| 13 | G, >60 | G, >30 | G | 0 | nc | nc | Av. > 250 | G++ | <30 | Av. | Av. | nc |
| 14 | G, >60 | G, >30 | G | 0 | nc | nc | Av. > 250 | G++ | <30 | Av. | Av. | nc |
| 15 | G, >60 | G, >30 | G | 0 | nc | nc | Av. > 250 | G++ | <30 | P | Av. | nc |
| 16 | G, >60 | G, >30 | G | 0 | nc | nc | Av. > 250 | G++ | <30 | P | Av. | nc |
| 17 | G, >60 | Av., >25 | G | 0 | nc | nc | Av. > 250 | G++ | <30 | P | Av. | nc |
| 18 | VG, >80 | G, >30 | VG | 0 | 0 | 3 | Av. > 250 | VG | <10 | P | G | nc |
| 19 | G, >60 | Av., >25 | VG | 0 | 0 | nc | nc | nc | nc | Nc | nc | nc |
| 20 | VG, >80 | G, >30 | VG | 0 | 0 | 0 | Av. > 250 | VG | <10 | P | G+ | nc |
| 21 | VG, >80 | G, >30 | G | 0 | nc | nc | G > 500 | G+ | 45 | Av. | G | nc |
| 22 | VG, >80 | G, >30 | VG | 0 | 0 | 0 | VG > 1000 | G+ | 41 | VG | G | nc |
| 23 | VG, >80 | G, >30 | VG | 0 | 0 | 0 | VG > 1000 | VG | <30 | VG | Av. | nc |
| 24 | VG, >80 | G, >30 | VG | 0 | 0 | 0 | VG > 1000 | VG | <30 | VG | Av. | nc |
| 25 | VG, >80 | G, >30 | G | 0 | nc | nc | G > 500 | G++ | <30 | VG | Av. | nc |
| 26 | VG, >80 | G, >30 | G | 0 | nc | nc | Av. > 250 | VG | <10 | VG | G+ | nc |
| 27 | VG, >80 | G, > 30 | VG | 0 | 5 | 50 | VG > 1000 | G+ | 35 | P | G | nc |
| 28 | VG, >80 | G, >30 | G+ | 0 | 0 | 50 | G > 500 | G+ | 37 | VP | G | nc |
| 29 | VG, >80 | G, >30 | G+ | 0 | 30 | 70 | VG > 1000 | G+ | 41 | P | G | nc |
| 30 | VG, >80 | G, >30 | VG | 0 | 0 | 0 | VG > 1000 | G | 59 | P | G+ | nc |
| 31 | G, >60 | G, >30 | G | 0 | nc | nc | VG > 1000 | Av. | 110 | Av. | nc | nc |
| 32 | G, >60 | G, >30 | G | 0 | nc | nc | VG > 1000 | Av. | 116 | VG | nc | nc |
| 33 | VG, >80 | G, >30 | G+ | 0 | 0 | 3 | Av. > 250 | VG | <10 | VG | G | nc |
| 34 | VG, >80 | G, >30 | G | 0 | 0 | 90 | Av. > 250 | VG | <10 | VG | G | nc |
| 35 | VG, >80 | G, >30 | VG | 0 | 0 | 0 | G > 500 | VG | <10 | VG | G | nc |
| 36 | VG, >80 | G, >30 | VG | 0 | 0 | 0 | Av. > 250 | VG | <10 | VG | G+ | no |
| 37 | VG, >80 | G, >30 | G | 0 | nc | nc | Av. > 250 | VG | <10 | Nc | nc | yes |
| 38 | VG, >80 | G, >30 | G+ | 0 | nc | nc | Av. > 250 | VG | <10 | Nc | nc | yes |
| 39 | Av., >30 | Av., >25 | G | 0 | nc | nc | Av. > 250 | G++ | <20 | Nc | nc | nc |
| 40 | Av., >30 | Av., >25 | G | 0 | nc | nc | Av. > 250 | G++ | <20 | Nc | nc | nc |
| 41 | Av., >30 | Av., >25 | G | 0 | nc | nc | nc | G++ | <20 | VG | nc | nc |
| 42 | Av., >30 | Av., >25 | G | 0 | 0 | nc | nc | G++ | <20 | VG | nc | nc |
| 43 | Av., >30 | Av., >25 | G | 0 | 0 | nc | nc | G++ | <20 | VG | nc | nc |
| 44 | G, >60 | G, >30 | nc | nc | nc | nc | nc | G+ | 31 | P | nc | nc |
| 45 | G, >60 | G, >30 | nc | nc | nc | nc | nc | G++ | <30 | Av. | nc | nc |
| 46 | VG, >80 | G, >30 | nc | nc | nc | nc | nc | G+ | 31 | Av. | nc | nc |
| 47 | G, >60 | G, >30 | nc | nc | nc | nc | nc | G+ | 39 | Av. | nc | nc |

APPENDIX 2-continued

Evaluation of the structures according to the invention:

| | 1 | 2 | 3 | 4 | 5 | 6 | 7 | 8 | 9 | 10 | 11 | 12 |
|---|---|---|---|---|---|---|---|---|---|---|---|---|
| 48 | VG, >80 | G, >30 | nc | nc | nc | nc | nc | VG | <10 | Av. | nc | nc |
| 49 | Av., >30 | G, >30 | nc | nc | nc | nc | nc | G++ | <20 | VG | Nc | nc |
| 50 | G, >60 | G, >30 | nc | nc | nc | nc | nc | G++ | <30 | Av. | Nc | nc |
| 51 | G, >60 | G, >30 | G | 0 | Nc | nc | Nc | Nc | nc | VP | VG | Nc |
| 52 | G, >60 | G, >30 | G | 0 | Nc | nc | Nc | Av. | 190 | VP | G+ | nc |
| 53 | G, >60 | G, >30 | G | 0 | Nc | nc | Av. > 250 | G++ | <30 | Av. | Av. | Nc |
| 54 | G, >60 | G, >30 | G | 0 | Nc | nc | Nc | VG | <20 | Nc | Av. | Nc |
| 55 | G, >60 | G, >30 | G | 0 | Nc | nc | Nc | VG | <10 | VP | G | Nc |
| 56 | G, >60 | G, >30 | G | 0 | Nc | nc | Nc | VG | <10 | VP | G+ | Nc |
| 57 | G, >60 | G, >30 | G | 0 | Nc | nc | Nc | VG | <10 | VP | G | Nc |
| 58 | G, >60 | G, >30 | G+ | 0 | 0 | nc | Nc | VG | <10 | VG | G+ | Nc |
| 59 | G, >60 | G, >30 | G+ | 0 | 0 | nc | Nc | VG | <10 | VG | G+ | Nc |
| 60 | G, >60 | G, >30 | G+ | 0 | 0 | nc | Av. > 250 | VG | <10 | VG | G+ | Nc |
| 61 | G, >60 | G, >30 | G+ | 0 | Nc | nc | Nc | VG+ | <3 | VG | G+ | Nc |
| 62 | G, >60 | G, >30 | G+ | 0 | 0 | nc | Nc | G++ | <30 | VG | G | Nc |
| 63 | G, >60 | G, >30 | G | 0 | nc | nc | Nc | VG+ | <3 | Av. | Av. | Nc |
| 64 | Av., >30 | G, >30 | G+ | 0 | 0 | nc | Nc | VG+ | <3 | TN | Av. | Nc |
| 65 | Av., >30 | G, >30 | G+ | 0 | 0 | nc | Nc | VG+ | <3 | VG | Av. | Nc |
| 66 | Av., >30 | G, >30 | G | 0 | Nc | nc | Av. > 250 | G++ | <30 | Av. | Av. | Nc |
| 67 | G, >60 | G, >30 | G | 0 | nc | nc | Nc | G++ | <30 | Av. | Av. | Nc |
| 68 | G, >60 | G, >30 | G | 0 | nc | nc | Nc | G++ | <30 | VP | Av. | Nc |
| 69 | G, >60 | G, >30 | VG | 0 | 0 | nc | Nc | Av. | 215 | VG | VG | Nc |
| 70 | G, >60 | G, >30 | VG | 0 | 0 | 0 | Nc | Av. | Nc | VG | G+ | Nc |
| 71 | G, >60 | G, >30 | VG | 0 | 0 | 0 | VG > 1000 | Av. | Nc | VG | G+ | Nc |
| 72 | G, >60 | G, >30 | G | 0 | nc | nc | nc | VG | <10 | VG | G | Nc |
| 73 | G, >60 | G, >30 | G | 0 | nc | nc | nc | Av. | 185 | VP | G+ | Nc |
| 74 | G, >60 | G, >30 | G | 0 | nc | nc | nc | G++ | <30 | Av. | Av. | Nc |
| 75 | G, >60 | G, >30 | G | 0 | nc | nc | nc | VG | <10 | VP | G | Nc |
| 76 | G, >60 | G, >30 | G+ | 0 | 0 | nc | nc | VG | <10 | VG | G+ | Nc |
| 77 | G, >60 | G, >30 | G | 0 | nc | nc | nc | VG | <10 | VP | G+ | Nc |
| 78 | G, >60 | G, >30 | G | 0 | nc | nc | nc | G++ | <30 | VP | Av. | Nc |
| 79 | G, >60 | G, >30 | G | 0 | nc | nc | nc | VG+ | <3 | VG | Av. | Nc |
| 80 | G, >60 | G, >30 | VG | 0 | 0 | nc | nc | Av. | 160 | VG | G+ | Nc |
| 81 | G, >60 | G, >30 | G | 0 | nc | nc | nc | VG | <10 | VG | G | Nc |
| 82 | G, >60 | G, >30 | G | 0 | nc | nc | nc | G++ | <30 | Av. | Av. | Nc |
| 83 | G, >60 | G, >30 | G | 0 | nc | nc | nc | G++ | <30 | Av. | Av. | Nc |
| 84 | G, >60 | G, >30 | G | 0 | nc | nc | nc | VG | <10 | VG | G | Nc |
| 85 | G, >60 | G, >30 | G | 0 | nc | nc | Nc | G+ | <50 | Av. | G | Nc |
| 86 | G, >60 | G, >30 | G | 0 | nc | nc | Nc | G++ | <30 | Av. | G | Nc |

APPENDIX 3

Evaluation of the structures of the counterexamples:

| | 1 | 2 | 3 | 4 | 5 | 6 | 7 | 8 | 9 | 10 | 11 |
|---|---|---|---|---|---|---|---|---|---|---|---|
| 1 | VG, >80 | VP, 3 | nc | nc | nc | nc | nc | nc | nc | nc | Nc |
| 2 | G, >60 | VP, 3 | nc | nc | nc | nc | nc | nc | nc | nc | Nc |
| 3 | P, 27 | P, 13 | nc | nc | nc | nc | nc | nc | nc | nc | Nc |
| 4 | P, 28 | P, 16 | nc | nc | nc | nc | nc | nc | nc | nc | Nc |
| 5 | Av., 32 | P, 19 | nc | nc | nc | nc | nc | nc | nc | nc | Nc |
| 6 | P, 23 | P, 20 | nc | nc | nc | nc | nc | nc | nc | nc | Nc |
| 7 | P, 20 | P, 12 | nc | nc | nc | nc | nc | nc | nc | nc | Nc |
| 8 | P, 27 | P, 15 | nc | nc | nc | nc | nc | nc | nc | nc | Nc |
| 9 | Av., 33 | P, 16 | nc | nc | nc | nc | nc | nc | nc | nc | Nc |
| 10 | P, 12 | nc | nc | nc | nc | nc | nc | nc | nc | nc | Nc |
| 11 | VP, <5 | nc | nc | nc | nc | nc | nc | nc | nc | nc | Nc |
| 12 | P, 20 | P, 13 | nc | nc | nc | nc | nc | nc | nc | nc | Nc |
| 13 | Av., 55 | VP, 0 | nc | nc | nc | nc | nc | nc | nc | nc | Nc |
| 14 | VP, <5 | nc | nc | nc | nc | nc | nc | nc | nc | nc | Nc |
| 15 | P, 30 | nc | nc | nc | nc | nc | nc | P | 220 | nc | Nc |
| 16 | nc | nc | Nc | nc | nc | nc | nc | P | 235 | nc | Nc |
| 17 | nc | nc | Nc | nc | nc | nc | VP < 50 | nc | nc | VP | Nc |
| 18 | nc | nc | Nc | nc | nc | nc | VP < 50 | nc | nc | nc | Nc |
| 19 | nc | nc | VP | 100 | 100 | 100 | nc | nc | nc | nc | Nc |
| 20 | nc | nc | P | 80 | 100 | 100 | nc | nc | nc | nc | Nc |
| 21 | VP, <5 | nc | Nc | nc | nc | nc | nc | nc | nc | nc | Nc |
| 22 | VP, <5 | nc | Nc | nc | nc | nc | nc | nc | nc | nc | Nc |
| 23 | — | — | G+ | 0 | 7 | 53 | P < 250 | P | 350 | VG | VG |
| 24 | P > 10, <20 | VP, <5 | G+ | 0 | 100 | 100 | nc | nc | nc | Av. | Av. |
| 25 | P > 10, <20 | VP, <5 | G+ | 0 | 100 | 100 | nc | nc | nc | Av. | Av. |

APPENDIX 4

| | Examples Appendix 2 No. | | |
|---|---|---|---|
| | 33<br>5 layers | 18<br>4 layers | 2<br>3 layers |
| Extruder 1, internal | PA11-TL | PA6OYE | PA6OY |
| Z1, °C. | 180 | 200 | 200 |
| Z2, °C. | 200 | 220 | 220 |
| Z3, °C. | 220 | 240 | 240 |
| Z4, °C. | 230 | 240 | 240 |
| Z5, °C. | 240 | 240 | 240 |
| Z6, °C. | 240 | 240 | 240 |
| Z7, °C. | 240 | 240 | 240 |
| Screw spin speed, rpm | 28.3 | 35 | 28.3 |
| Torque, % | 38 | 24 | 28 |
| Pressure, bar | 299 | 142 | 194 |
| Extruder 2 | Adhesive composition 2 | EVOH | PA6OY |
| Z1, °C. | 170 | 200 | 200 |
| Z2, °C. | 190 | 220 | 220 |
| Z3, °C. | 210 | 240 | 240 |
| Z4, °C. | 240 | 240 | 240 |
| Z5, °C. | 240 | 240 | 240 |
| Screw spin speed, rpm | 17 | 32.5 | 30.3 |
| Torque, % | 33 | 28 | 18 |
| Pressure, bar | 73 | 83 | 81 |
| Extruder 3 | EVOH | PA11Cu | PA11Cu |
| Z1, °C. | 170 | 190 | 200 |
| Z2, °C. | 190 | 210 | 220 |
| Z3, °C. | 210 | 230 | 240 |
| Z4, °C. | 230 | 240 | 250 |
| Z5, °C. | 240 | 240 | 250 |
| Z6, °C. | 240 | 240 | 250 |
| Z7, °C. | 240 | 240 | 250 |
| Screw spin speed, rpm | 9.6 | 28.6 | 32.3 |
| Torgue, % | 40 | 40 | 32 |
| Pressure, bar | 97 | 281 | 100 |
| Extruder 4 | Adhesive composition 2 | Adhesive composition 2 | Adhesive composition 2 |
| Z1, °C. | 190 | 190 | 200 |
| Z2, °C. | 220 | 210 | 220 |
| Z3, °C. | 230 | 230 | 240 |
| Z4, °C. | 240 | 260 | 250 |
| Z5, °C. | 240 | 260 | 270 |
| Screw spin speed, rpm | 27 | 12.4 | 12.1 |
| Torque, % | 7 | 28 | 15 |
| Pressure, bar | 22 | 85 | 84 |
| Extrudeuse 5, exteme | PA11Cu | PA11Cu | PA11Cu |
| Z1, °C. | 170 | 190 | 200 |
| Z2, °C. | 200 | 210 | 220 |
| Z3, °C. | 220 | 220 | 240 |
| Z4, °C. | 240 | 230 | 250 |
| Z5, °C. | 240 | 240 | 250 |
| Z6, °C. | 240 | 240 | 250 |
| Z7, °C. | 240 | 240 | 250 |
| Screw spin speed, rpm | 37.3 | 38.3 | 32.8 |
| Torque, % | 30 | 38 | 28 |
| Pressure, bar | 74 | 287 | 98 |
| Coextrusion head | | | |
| Temp,, °C.<br>Tools | 240 | 260 | 260 |
| Z1, °C. | 240 | 260 | 260 |
| Z2, °C. | 240 | 260 | 260 |
| Z3, °C. | 230 | 260 | 260 |
| Calibration | | | |
| Gauge diameter, mm | 9 | 8.85 | 9.5 |
| bleed rate, l/h | 36 | 36 | 44 |
| gauge-die distance, mm | 60 | 35 | 30 |
| pressure reduction, mbar<br>Line | 100 | 80 | 50 |
| Line speed, m/min | 20 | 20 | 20 |

The invention claimed is:

1. A structure comprising at least two layers, wherein one layer is an adhesive layer (I) having a composition comprising:
   at least one polyamide noted A, with a mean number of carbon atoms per nitrogen atom, noted CA, of between 4 and 8.5;
   at least one polyamide noted B, with a melting point of greater than or equal to 180° C. and a mean number of carbon atoms per nitrogen atom, noted CB, of between 7 and 10;
   at least one polyamide noted C, with a mean number of carbon atoms per nitrogen atom, noted CC, of between 9 and 18:
   wherein at least 50% by weight of the composition is formed from polyamides A, B and C,
   wherein said polyamides in the composition have a mass-weighted mean of heats of fusion of greater than 25 J/g (DSC), and wherein polyamide A comprises from 8% to 33% by weight of the total weight of polyamides present in the composition, polyamide B comprises from 34% to 84% by weight of the total weight of polyamides present in the composition, and polyamide C comprises from 8% to 33% by weight of the total weight of polyamides present in the composition and
   wherein additionally the mean number of carbon atoms per nitrogen atom of each polyamides A, B and C also satisfying the following: CA<CB<CC.

2. The structure according to claim 1, wherein (CB-CA) and/or (CC-CB) is between 1 and 4.

3. The structure according to claim 1, wherein polyamide A has a melting point greater than or equal to 210° C. and polyamide C has a melting point that is less than 200° C.

4. The structure according to claim 1, wherein polyamide A is chosen from PA6, PA4.6 and PA6.6, polyamide B is chosen from PA6.10 and PA6.12, and polyamide C is chosen from PA10.10, PA11, PA12, PA10.12 and PA6.18.

5. The structure according to claim 1, wherein the polyamide noted A has a mean number of carbon atoms per nitrogen atom, noted CA, of between 4 and 7.

6. The structure according to claim 1, wherein the polyamide noted B has a mean number of carbon atoms per nitrogen atom, noted CB, of between 7.5 and 9.5.

7. The structure according to claim 1, wherein the polyamide noted C has a mean number of carbon atoms per nitrogen atom, noted CC, of between 10 and 18.

8. The structure according to claim 1, wherein (CB-CA) and/or (CC-CB) is between 2 and 3.

9. The structure according to claim 1, wherein the composition comprises from 50% to 76% by weight of polyamide B relative to the total weight of polyamides present in the composition.

10. The Structure according to claim 1, wherein a second layer is a barrier layer (II), and wherein said barrier layer (II) is a composition comprising polymers that are barriers to biofuels.

11. The structure of claim 10, wherein the second layer is a barrier layer (II), and wherein said barrier layer (II) is a composition comprising polymers chosen from EVOH and polyamide A, or a mixture thereof.

12. The structure according to claim 1 which comprises at least a third layer, and wherein said third layer is a tough layer (III) formed from a composition comprising polyamide C, the adhesive layer (I) being arranged between the said tough layer (III) and a barrier layer (II) and wherein each layer has a contact zone and wherein the layers adhere to each other via their respective contact zones.

13. The structure according to claim 12 wherein polyamide C is PA11, PA12, PA10.10, PA10.12 and PA12/10T or a mixture thereof.

14. The structure according to claim 1, which comprises, in the following order:
- a third layer, referred to as a tough layer (III), formed from a composition comprising polyamide C,
- the adhesive layer (I),
- a second layer, referred to as a barrier layer (II), formed from a composition comprising EVOH, and
- a fourth layer (IV) formed from a composition comprising polyamide A,
- wherein each layer has a contact zone and wherein the layers adhere to each other via their respective contact zones.

15. The structure according to claim 1, which comprises the following five successive layers:
- a tough layer (III) formed from a composition comprising polyamide C,
- the adhesive layer (I),
- a barrier layer (II) formed from a composition comprising EVOH,
- another adhesive layer (I), and
- a tough layer (III) formed from a composition comprising polyamide C,
- wherein each layer has a contact zone and wherein the layers adhere to each other via their respective contact zones.

16. The structure according to claim 1, which is a pipe, a container, a film or a plate.

\* \* \* \* \*